US006307858B1

(12) United States Patent
Mizukoshi et al.

(10) Patent No.: US 6,307,858 B1
(45) Date of Patent: Oct. 23, 2001

(54) ATM CELL TRANSMISSION SYSTEM

(75) Inventors: Nobuyuki Mizukoshi; Hideo Ishida; Noboru Sato, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/209,697

(22) Filed: Dec. 11, 1998

(30) Foreign Application Priority Data

Dec. 12, 1997 (JP) ................................... 9-343393

(51) Int. Cl.[7] ............................. H04L 12/28; H04L 12/56
(52) U.S. Cl. ........................................... 370/395; 370/419
(58) Field of Search ..................................... 370/395, 396, 370/398, 401, 412, 413, 415, 417, 419, 422, 423, 428, 429, 420, 421, 468, 389, 400, 449

(56) References Cited

U.S. PATENT DOCUMENTS

| 5,485,456 | 1/1996 | Shtayer et al. ....................... 370/60 |
| 5,867,677 | * 2/1999 | Tsukamoto ........................... 710/131 |
| 5,889,778 | * 3/1999 | Huscroft et al. .................... 370/395 |
| 6,075,788 | * 6/2000 | Vogel ................................... 370/395 |

FOREIGN PATENT DOCUMENTS 2296621  7/1996  (GB) .

OTHER PUBLICATIONS

"Utopia, An ATM–PHY Interface Specification", The ATM Forum Technical Committee, Utopia Level 2, Version 1.0, Jun. 1995, pp. 1–66.

"ATM–LAN 25.6 Mbps PHY LSI μPD98408, 25.6 Mbps PHY LSI μPD98408 for ATM–LAN," *NEC*, vol. 50, No. 3, 1997.

* cited by examiner

*Primary Examiner*—Douglas Olms
*Assistant Examiner*—Phirin Sam
(74) *Attorney, Agent, or Firm*—Foley & Lardner

(57) ABSTRACT

In an ATM cell transmission system having an ATM layer device (1), a data path interface (3) and a plurality of normal PHY (Physical) layer devices (2-0 to 2-M) according to Utopia Level 2 specification, the ATM layer device (1) comprises: a cell buffer (4); FIFO memories (5-0 to 5-M) each corresponding to each of the normal PHY layer devices (2-0 to 2-M); an output controller (5') for controlling the cell buffer (4) to output an ATM cell to be transmitted through one of the normal PHY layer devices (2-0 to 2-M) into corresponding one of the FIFO memories (5-0 to 5-M) on condition that the ATM cell is stored in the cell buffer (4) and the corresponding one of the FIFO memories (5-0 to 5-M) is not full; and a cell transmission controller (10) for performing polling of the normal PHY layer devices (2-0 to 2-M), designating a selected PHY layer device among the normal PHY layer devices (2-0 to 2-M) which have returned the HIGH level of the cell transmission allowance signal (TxClav) to the polling and whereof corresponding FIFO memories (5-0 to 5-M) are not empty, selecting one of the FIFO memories (5-0 to 5-M) corresponding to the selected PHY layer device as a next sender of cell data to be transmitted through the data path interface (3), and designating the selected PHY layer device at an end of the current transmission cycle as a next receiver of the cell data.

14 Claims, 17 Drawing Sheets

ATM CELL TRANSMISSION SYSTEM

BACKGROUND OF THE INVENTION

The present invention relates to an ATM (Asynchronous Transfer Mode) cell transmission system having an ATM layer device and more than one PHY (physical) layer devices connected to the ATM layer device by way of a data path interface according to Utopia (Universal Test & Operations PHY interface for ATM) Level 2 specification for transmitting ATM cells through the PHY layer devices.

Specifications of interface between the ATM layer and the physical layer for absorbing diversity of PHY layer devices are studied in The ATM Forum as the Utopia.

A data path interface defined for interfacing one ATM layer device with one PHY layer device is the Utopia Level 1 interface, and that defined for interfacing one ATM layer device with more than one PHY layer devices is the Utopia Level 2 interface, which is described in "Utopia, An ATM-PHY Interface Specification", pp. 1 to 66, Utopia Level 2, v1.0 (af-phy-0039.000), published by The ATM Forum Technical Committee.

FIG. 15 is a block diagram illustrating a basic configuration of an ATM cell transmission system having an ATM layer device 1, a plurality of PHY layer devices 2-0 to 2-M and a data path interface 3 according to the Utopia Level 2 for interfacing the ATM layer device 1 with the PHY layer devices 2-0 to 2-M for transmitting ATM cells through the PHY layer devices 2-0 to 2-M. Addresses O to M are assigned to the PHY layer devices 2-0 to 2-M, respectively.

FIG. 16 is a timing chart for illustrating operation of the data path interface 3, which is described in page 19 of the "Utopia, An ATM-PHY Interface Specification".

In FIGS. 15 and 16, TxClk denotes a transmission clock having a clock cycle T, which is delivered from the ATM layer device 1 to each of the PHY layer devices 2-0 to 2-M. TxAddr denotes an address signal whereby addresses of the PHY layer devices 2-0 to 2-M are transmitted from the ATM layer device 1 to the PHY layer devices 2-0 to 2-M for polling and selecting one of the PHY layer devices 2-0 to 2-M. Each of the addresses is represented with five-bit data and an address '11111' ('1F' in hexadecimal) represents a null PHY port assigned to neither of the PHY layer devices 2-0 to 2-M.

TxClav (Transmission Cell Available) denotes a cell transmission allowance signal having three statuses transmitted from one of the PHY layer devices 2-0 to 2-M to the ATM layer device 1. When a PHY layer device is polled with its address transmitted by the address signal TxAddr at a clock cycle, the designated PHY layer device makes HIGH the cell transmission allowance signal TxClav for next one clock cycle on condition that the PHY layer device can accept one more ATM cell as a whole, and makes LOW the cell transmission allowance signal TxClav for a period of the next one clock when the PHY layer device cannot accept the whole ATM cell, as shown in FIG. 16, wherein the cell transmission allowance signal TxClav is made HIGH by the PHY layer devices 2-(N−3), 2-(N+3) and 2-N having addresses N−3, N+3 and N, respectively, at clock cycles #4, #10 and #14, polled at clock cycles #3, #9 and #13, respectively, and made LOW by the PHY layer devices 2-(N+2), 2-(N−2), 2-(N−1), 2-(N+1) and again by the PHY layer device 2-(N+1).

An ATM cell consists of a cell header of 5 octets (bytes) H1 to H5 and a payload of 48 octets P1 to P48, whereof a part P35 to P48 of an ATM cell and H1 to H5 of another ATM cell is depicted in FIG. 16 as transmission data TxData. The PHY layer device polled with its address determines to make HIGH or LOW the cell transmission allowance signal TxClav according to whether the PHY layer device has a room or not for receiving the 53-octet data H1 to H5 and P1 to P48 of the ATM cell as a whole.

TxEnb (Transmission Enable). denotes a transmission enabling signal delivered from the ATM layer device 1 to the PHY layer devices 2-0 to 2-M for notifying transmission of cell data, indicating a selected PHY layer device whereto the cell data is to be forwarded by putting address thereof on the address signal TxAddr at the same clock cycle.

TxData (Transmission Data) denotes cell data delivered from the ATM layer device 1 to the selected PHY layer device, wherein cell header of five octets H1 to H5 followed by payload of 48 octets P1 to P48 are transmitted octet by octet in synchronization with the transmission clock TxClk, and TxSOC (Transmission Start Of Cell) denotes a transmission start signal indicating beginning of the cell data, that is, a first header octet H1 of an ATM cell to be transmitted.

As above described, the ATM layer device 1 polls status of each one of the PHY layer devices 2-0 to 2-M by putting its address on the address signal TxAddr one by one, and a PHY layer device designated by a polling address at a clock cycle drives the cell transmission allowance signal TxClav to HIGH or LOW for a period of one clock cycle just following the clock cycle of the polling address. Then, selecting an appropriate PHY layer device among PHY layer devices which have made HIGH the cell transmission allowance signal TxClav, the ATM layer device 1 notifies the selection by asserting the transmission enabling signal TxEnb for a clock cycle and putting address of the selected PHY layer device on the address signal TxAddr at the same time. When the transmission enabling signal TxEnb is made HIGH, every of the PHY layer devices 2-0 to 2-M checks the address on the address signal TxAddr, and the selected PHY layer device acknowledges the selection by driving the cell transmission allowance signal TxClav to HIGH at the next clock cycle. The selection remains valid until the transmission enabling signal TxEnb is again made HIGH.

In the example of FIG. 16, payload octets P35 to P48 are transmitted to a selected PHY layer device 2-N at clock cycles #1 to #14 as the transmission data TxData, which represents a part of a cell transmission cycle consisting of 54 clock cycles, that is, 53 clock cycles to #14 for transmitting five header octets H1 to H5, 48 payload octets P1 to P48, and one clock cycle #15 for designating a next selection.

For preparing the next selection, polling of the PHY layer devices 2-0 to 2-M is performed in parallel with the data transmission during second to 53-th clock cycles of a cell transmission cycle, as shown in FIG. 16, wherein polling for selecting the PHY layer device 2-(N+3) is performed until clock cycle #14 where the last payload octet P48 is transmitted, and polling for selecting a next PHY layer device begins at clock cycle #17 where the second header octet H2 is transmitted.

In the example, the cell transmission allowance signal TxClav indicates that the PHY layer devices 2-(N−3), 2-(N+3) and 2-N having respective addresses N−3, N+3 and N can accept data of an ATM cell as a whole. The PHY layer device 2-N, which is under receiving cell data at the cell transmission cycle, drives the cell transmission allowance signal TxClav to HIGH on condition that it can accept another whole ATM cell besides cell data actually receiving.

In the following paragraphs, PHY layer devices which drives the cell transmission allowance signal TxClav to HIGH when it can accept a whole ATM cell besides cell data actually receiving, if there is any, are to be called the normal PHY layer devices according to a normal specification defined in the Utopia Level 2 specification.

Returning to the example of FIG. 16, selecting the PHY layer device 2-(N+3) among the above PHY layer devices 2-(N−3), 2-(N+3) and 2-N, the ATM layer device 1 notifies the selection by putting the address N+3 on the address signal TxAddr at clock cycle #15, and begins to transmit cell data of a next ATM cell at clock cycle #16 from a top octet, namely, the first header octet H1 as the transmission data TxData to the PHY layer device 2-(N+3), followed by octets H2, H3 , . . . transmitted at clock cycles #17, #18, . . . .

Here, the ATM layer device 1 may select and designate another one of the PHY layer devices 2-(N−3), 2-(N+3) and 2-N at the clock cycle #15 in place of the PHY layer device 2-(N+3), of course, and it is to be noted that the cell transmission allowance signal TxClav made HIGH by a PHY layer device actually receiving cell data, that is, the PHY layer device 2-N, in the example, is defined to be not valid when it is driven more than five clock cycles before transmission of the concerning cell data ends, according to the Utopia Level 2 specification. Hence, polling of the PHY layer device 2-N is performed by the ATM layer device 1 lastly at clock cycle #13, in FIG. 16.

The ATM layer device 1 begins again polling of PHY layer devices 2-0 to 2-M at second clock cycle #17 of the following cell transmission cycle forwarded to the PHY layer device 2-(N+3), for selecting a PHY layer device for a next cell transmission cycle. In the example of FIG. 16, an address N+1 is put on the address signal TxAddr at clock cycle #17 for polling the PHY layer device 2-(N+1), which is followed by the address '1F' of the null PHY port put on the address signal TxAddr at clock cycle #18. Thus, one PHY layer device is polled at every two clock cycles, in the example, and 26 PHY layer devices can be polled at maximum in one cell transmission cycle.

FIG. 17 is a flowchart illustrating driving operation of the cell transmission allowance signal TxClav performed by a normal PHY layer device defined in the Utopia Level 2 specification, that is, a PHY layer device which makes HIGH the cell transmission allowance signal TxClav when it can accept a whole ATM cell besides cell data actually receiving. In the flowchart of FIG. 17, a normal PHY layer device 2-n assigned with an address n is assumed to be polled at a clock cycle a.

At the clock cycle a, the PHY layer device 2-n checks whether the polling address on the address signal TxAddr is n or not (at step S1). When the polling address is n, the PHY layer device 2-n checks whether it can accept one more whole ATM cell or not (at step S2). When the check result is TRUE, the PHY layer device 2-n drives the cell transmission allowance signal TxClav to HIGH at the following clock cycle (a+1) (at step S3), and drives the cell transmission allowance signal TxClav to LOW at the following clock cycle (a+1) (at step S4) when the check result is FALSE. When the polling address on the address signal TxAddr is found to be not n at step S1, the PHY layer device 2-n ends the procedure, leaving the cell transmission allowance signal TxClav to be driven by another PHY layer device.

As heretofore described, necessary conditions of the normal PHY layer device and the ATM layer device are defined in the Utopia Level 2 specification together with details of the interface signals TxAddr and so on. However, no concrete configuration of the ATM layer device has been disclosed until now.

SUMMARY OF THE INVENTION

Therefore, a primary object of the present invention is to provide a concrete configuration example of an ATM layer device which can realize an ATM cell transmission system having high data transmission efficiency cooperating with the normal PHY layer devices according to the Utopia Level 2 specification.

Another object of the invention is to provide an ATM cell transmission system wherein the configuration of the ATM layer device is simplified by employing enhanced PHY layer devices defined in the Utopia Level 2 specification in place of the normal PHY layer devices.

Still another object of the invention is to provide an ATM cell transmission system having high data transmission efficiency with the simple configuration making use of the normal PHY layer devices and the enhanced PHY layer devices in parallel.

In order to achieve the object, an ATM cell transmission system according to a first embodiment of the invention has an ATM layer device, a data path interface and a plurality of normal PHY layer devices whereof each is connected to the ATM layer device by way of the data path interface and returns a HIGH level of a cell transmission allowance signal on condition said each can accept one more whole ATM cell when said each is polled by the ATM layer device through the data path interface; and the ATM layer device comprises:

a cell buffer for storing ATM cells to be transmitted through the normal PHY layer devices;

FIFO memories each provided corresponding to each one of the normal PHY layer devices;

an output controller for controlling the cell buffer to output an ATM cell to be transmitted through one of the normal PHY layer devices into one of the FIFO memories corresponding to said one of the normal PHY layer devices, on condition that the ATM cell is stored in the cell buffer and said one of the FIFO memories is not full;

a transmission cell selector for selecting one of the FIFO memories as a next sender for transmitting cell data through the data path interface at a next cell transmission cycle following a current cell transmission cycle; and a cell transmission controller for performing polling of the normal PHY layer devices, designating a selected PHY layer device among the normal PHY layer devices which have returned the HIGH level of the cell transmission allowance signal to the polling and whereof corresponding FIFO memories are not empty, controlling the transmission cell selector to select one of the FIFO memories corresponding to the selected PHY layer device as the next sender, and designating the selected PHY layer device at an end of the current transmission cycle as a next receiver of the cell data to be transmitted through the data path interface at the next cell transmission cycle.

Therefore, in the ATM cell transmission system according to the first embodiment, cell blocking called the HOL (Head of Line) blocking, wherein a cell stored in a FIFO memory is blocked to be outputted until another cell formerly inputted in the FIFO memory is outputted, is prevented, and accordingly, a high transmission efficiency is attained, by providing a FIFO memory for each one of the normal PHY layer devices.

In another ATM cell transmission system according to a second embodiment of the invention, the ATM layer device comprises:

a cell buffer for storing ATM cells to be transmitted through the normal PHY layer devices;

FIFO memories each provided corresponding to each one of the normal PHY layer devices;

a transmission cell selector for selecting one of the FIFO memories as a next sender for transmitting cell data through the data path interface at a next cell transmission cycle following a current cell transmission cycle; and a cell transmission controller for performing polling of the normal PHY layer devices, designating a selected PHY layer device among the normal PHY layer devices which have returned the HIGH level of the cell transmission allowance signal to the polling and satisfy either of a first condition that at least one ATM cell to be forwarded thereto is stored in the cell buffer and a second condition that corresponding FIFO memories are not empty, controlling the cell buffer to output an ATM cell to be transmitted through the selected PHY layer device into one of the FIFO memories corresponding to the selected PHY layer device on condition that the ATM cell is stored in the cell buffer, controlling the transmission cell selector to select said one of the FIFO memories as the next sender, and designating the selected PHY layer device at an end of the current transmission cycle as a next receiver of the cell data to be transmitted through the data path interface at the next cell transmission cycle.

Therefore, also in the ATM cell transmission system according to the second embodiment of the invention, the HOL blocking of the cell data is prevented by providing a FIFO memory for each one of the output ports, and accordingly, a high transmission efficiency is attained.

In another ATM cell transmission system according to a third embodiment having an ATM layer device, a data path interface and a plurality of enhanced PHY layer devices whereof each is connected to the ATM layer device by way of the data path interface and returns a HIGH level of a cell transmission allowance signal on condition said each can accept K more whole ATM cells when said each is polled by the ATM layer device through the data path interface, K being an integer more than one; the ATM layer device comprises:

a cell buffer for storing ATM cells to be transmitted through the enhanced PHY layer devices;

a FIFO memory;

a cell transmission controller for performing polling of the enhanced PHY layer devices, designating a selected PHY layer device among the enhanced PHY layer devices which have returned the HIGH level of the cell transmission allowance signal to the polling and satisfy a condition that at least one ATM cell to be forwarded thereto is stored in the cell buffer, controlling the cell buffer to output an ATM cell to be transmitted through the selected PHY layer device into the FIFO memory together with destination information of the ATM cell, controlling the FIFO memory to transmit cell data of an ATM cell through the data path at a next cell transmission cycle when the FIFO memory is not empty, and designating an enhanced PHY layer device indicated by the destination information of the ATM cell at an end of the current transmission cycle as a next receiver of the cell data to be transmitted through the data path interface at the next cell transmission cycle.

Therefore, in the ATM cell transmission system according to the third embodiment of the invention making use of enhanced PHY layer devices, the ATM cells need not wait at FIFO memory and no HOL blocking of the cell data occurs, realizing a high transmission efficiency of the ATM cell transmission system. Furthermore, the ATM layer device can be simply and economically configured with one FIFO memory.

In still another ATM cell transmission system according to a fourth embodiment of the invention having an ATM layer device, a data path interface and a plurality of PHY layer devices whereof each is connected to the ATM layer device by way of the data path interface, and each is either one of a normal PHY layer device which returns a HIGH level of a cell transmission allowance signal on condition said each can accept one more whole ATM cell when said each is polled by the ATM layer device through the data path interface and an enhanced PHY layer device which returns the HIGH level of the cell transmission allowance signal on condition said each can accept K more whole ATM cells when said each is polled by the ATM layer device through the data path interface, K being an integer more than one; the ATM layer device comprises:

a cell buffer for storing ATM cells to be transmitted through the PHY layer devices;

a FIFO memory;

a cell transmission controller for performing polling of the PHY layer devices, designating a selected PHY layer device among the PHY layer devices which have returned the HIGH level of the cell transmission allowance signal to the polling and satisfy a first condition that at least one ATM cell to be forwarded thereto is stored in the cell buffer and a second condition that addresses thereof are not registered as one of D selected port numbers, D being a number of cell transmission cycles needed for outputting an ATM cell from the cell buffer to the FIFO memory according to the polling after the polling is performed, controlling the cell buffer to output an ATM cell to be transmitted through the selected PHY layer device into the FIFO memory together with destination information of the ATM cell, replacing one of the D selected port numbers which is registered earliest with an address of the selected PHY layer device when the selected PHY layer device is the normal PHY layer device and with an invalid address when the selected PHY layer device is the enhanced PHY layer device, controlling the FIFO memory to transmit cell data of an ATM cell through the data path at a next cell transmission cycle when the FIFO memory is not empty, and designating a PHY layer device indicated by the destination information of the ATM cell at an end of the current transmission cycle as a next receiver of the cell data to be transmitted through the data path interface at the next cell transmission cycle.

Therefore, an ATM cell transmission system having a high transmission efficiency can be realized with a single FIFO memory according to the fourth embodiment of the invention, even when normal PHY layer devices defined in the Utopia Level 2 specification are included in the PHY layer devices connected to the data path interface.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
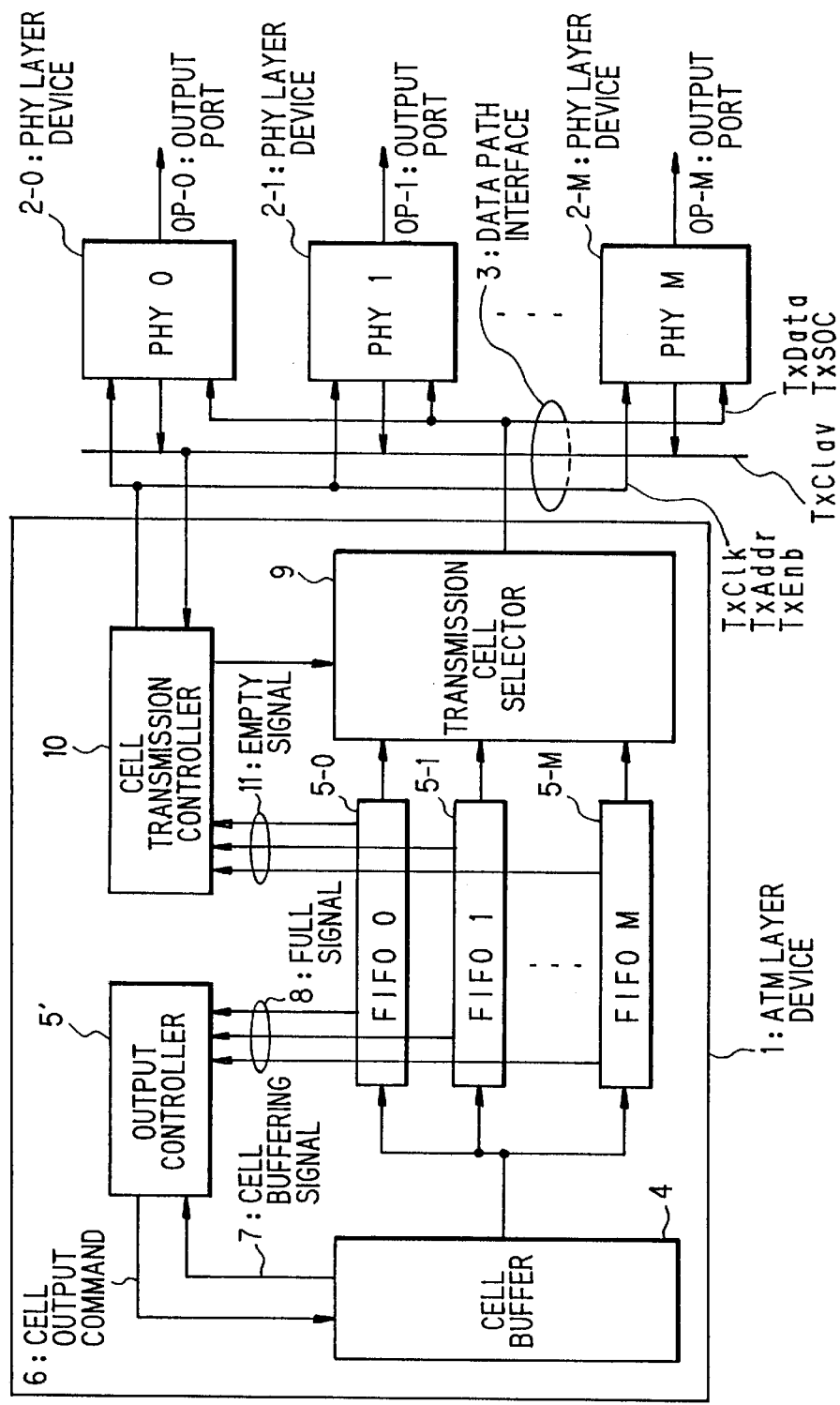
FIG. 1 is a block diagram illustrating an ATM cell transmission system according to a first embodiment of the invention.

FIG. 1 is a block diagram illustrating an ATM cell transmission system according to a first embodiment of the invention.

Figure 15:
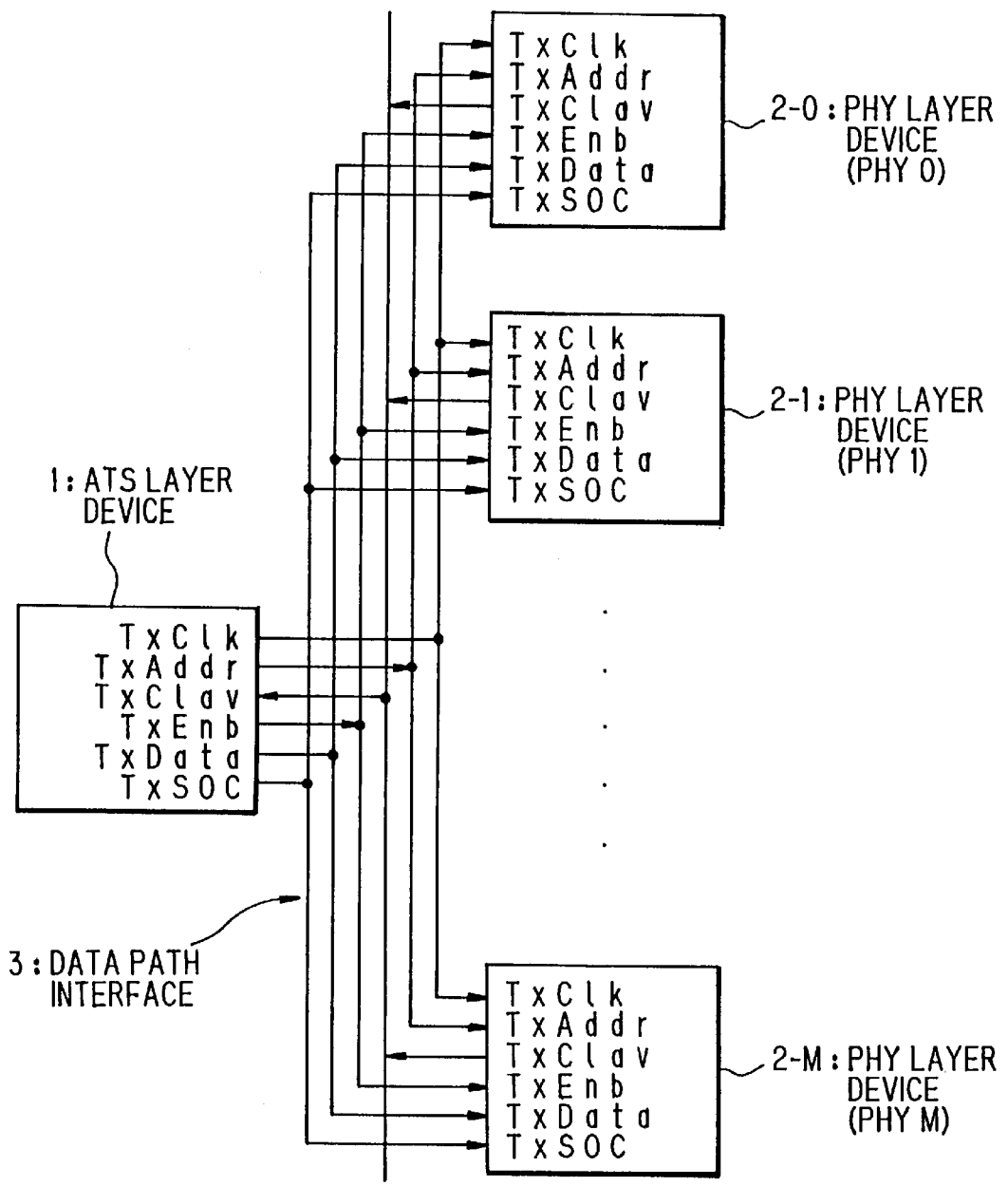
FIG. 15 is a block diagram illustrating a basic configuration of an ATM cell transmission system according to the Utopia Level 2 specification.

The ATM transmission system of FIG. 1 comprises an ATM layer device 1 such as an ATM switch, for example, PHY (physical) layer devices 2-0 to 2-M each provided for each one of a plurality of output ports OP-0 to OP-M of the ATM cell transmission system, and a data path interface 3 for connecting the ATM layer device 1 and the PHY layer devices 2-0 to 2-M, in the same way with the basic configuration of FIG. 15.

Figure 16:
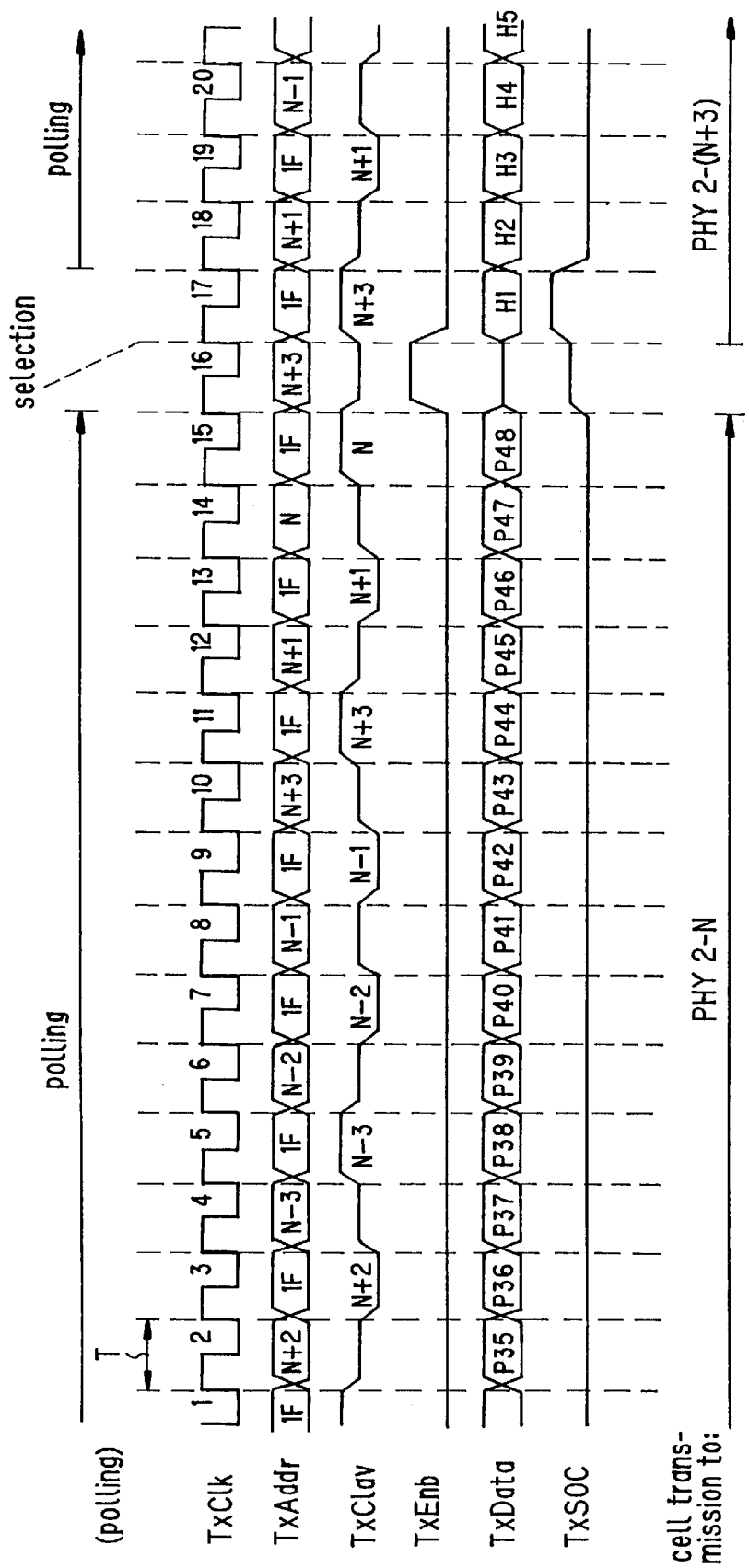
FIG. 16 is a timing chart for illustrating operation of the data path interface 3 of FIG. 15 described in the "Utopia, An ATM-PHY Interface Specification"

The PHY layer devices 2-0 to 2-M are the normal PHY layer devices defined in the Utopia Level 2 specification, and by way of the data path interface 3, which is also according to the Utopia Level 2 specification, a transmission clock TxClk, an address signal TxAddr, a cell transmission allowance signal TxClav, a transmission enabling signal TxEnb, transmission data TxData and a transmission start signal TxSOC are exchanged, in the same way as described in connection with the timing chart of FIG. 16.

It is assumed here that the ATM layer device 1 cannot start transmission of cell data form a cell buffer towards the data path interface 3 but five clock cycles after the cell transmission allowance signal TxClav is made HIGH by one of the PHY layer devices 2-0 to 2-M, or, in other words, there is imposed a condition that five clock cycles' delay is needed for starting transmission of cell data after the cell transmission allowance signal TxClav is made HIGH.

In the first embodiment, the ATM layer device 1 is so configured as to enabling the ATM cell transmission system to perform cell transmission with high transmission efficiency, even when such a condition of transmission delay is imposed.

For dealing with the condition of transmission delay, the ATM layer device 1 of FIG. 1 comprises FIFO (First-In-First-Out) memories 5-0 to 5-M each corresponding to each one of the PHY layer devices 2-0 to 2-M, an output controller 5', a transmission controller 10, a transmission cell selector 9, and a cell buffer 4. The FIFO memories 5-0 to 5-M are provided between the cell buffer 4 and the data path interface 3.

The cell buffer 4 corresponds to an output cell buffer when the ATM layer device 1 is an ATM switch, for example. The cell buffer 4 notifies to the output controller 5' for each of the output ports OP-0 to OP-M whether there is stored any ATM cell to be forwarded thereto or not by way of a cell buffering signal 7, and outputs the ATM cell to one of the FIFO memories 5-0 to 5-M corresponding to its destination in accordance with a cell output command 6 delivered from the output controller 5'.

When one of the FIFO memories 5-0 to 5-M becomes full, it outputs a full signal 8 to the output controller 5'.

The output controller 5' is notified of presence of the ATM cell to be forwarded to each of the output ports OP-0 to OP-M by the cell buffering signal 7, and notified of cell-acceptability of the FIFO memories 5-0 to 5-M by the full signals 8.

Figure 2:
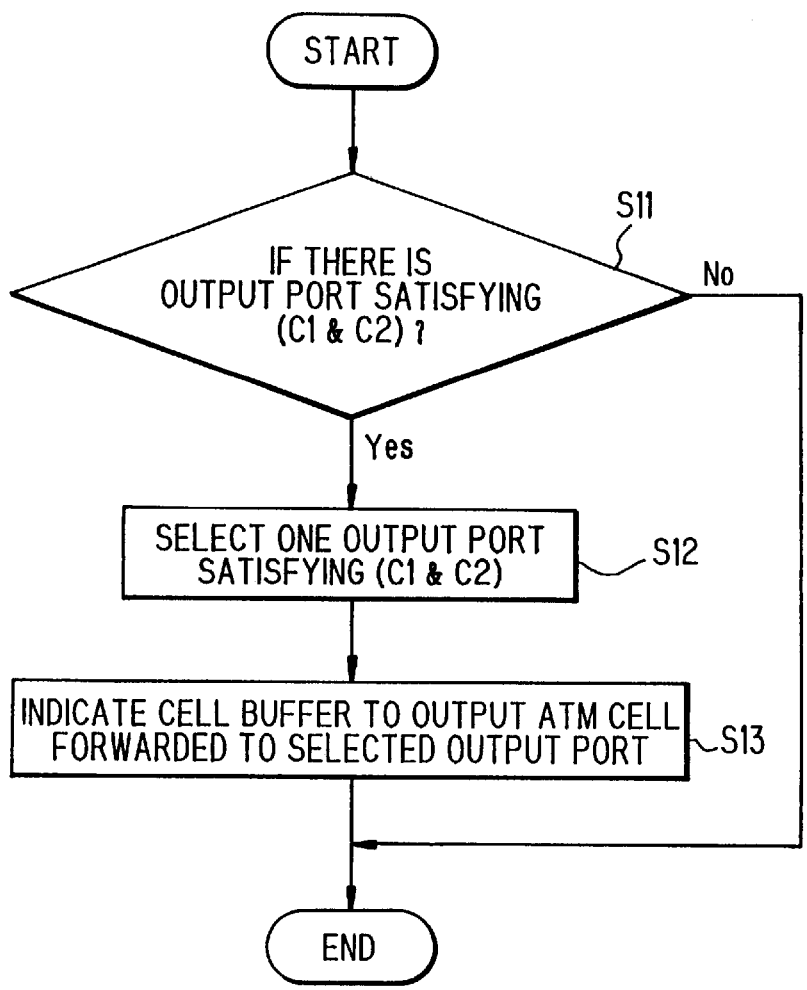
FIG. 2 is a flowchart for illustrating operation of the output controller 5' of FIG. 1 at a cell transmission cycle.

FIG. 2 is a flowchart for illustrating operation of the output controller 5' at a cell transmission cycle.

The output controller 5' checks (at step S11) if there is an output port OP-m, for every of m from 0 to M, which satisfies a first condition that there is stored at least one ATM cell to be forwarded to the output port OP-m in the cell buffer 4, and, at the same time, a second condition that the FIFO memory 5-m corresponding to the output port OP-m is not full.

When there is found no output port OP-m which satisfies the first and the second condition, the output controller 5' performs nothing else in the cell transmission cycle. When there is found at least one output port satisfying the first and the second condition, the output controller 5' designates one selected output port among output ports satisfying the first and the second condition (at step S12) according to an appropriate algorithm, and delivers the cell output command 6 to the cell buffer 4 (at step S13) indicating to output an ATM cell to be forwarded to the selected output port.

The cell buffer 4 outputs an ATM cell to be forwarded to the selected output port to corresponding one of the FIFO memories 5-0 to 5-M according to the cell output command 6.

The ATM cell stored in the FIFO memories 5-0 to 5-M are transmitted as the transmission data TxData, octed by octed, selected by the transmission cell selector 9 according to indication of the transmission controller 10.

Figure 3:
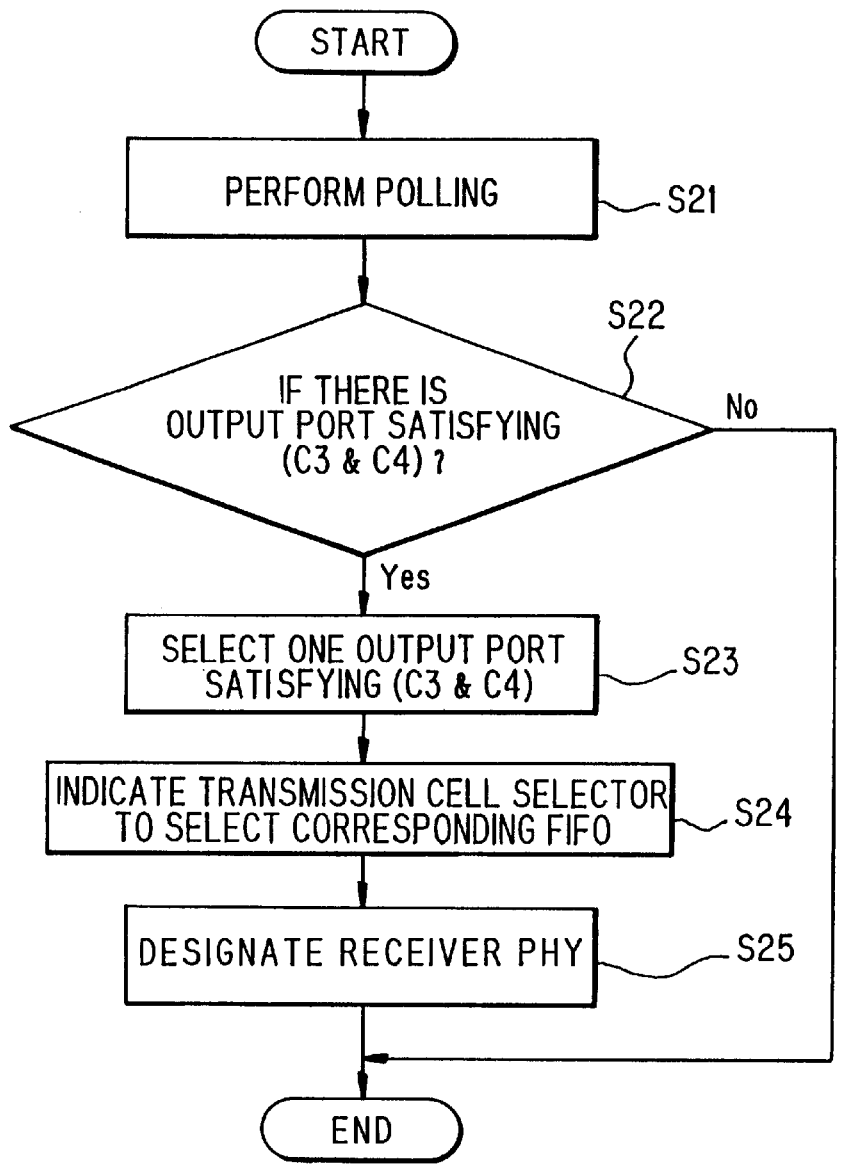
FIG. 3 is a flowchart illustrating operation of the cell transmission controller 10 and the transmission cell selector 9 of FIG. 1.

FIG. 3 is a flowchart illustrating operation of the cell transmission controller 10 and the transmission cell selector 9.

The cell transmission controller 10 performs polling of the PHY layer devices 2-0 to 2-M (at step S21) in a cell transmission cycle making use of the address signal TxAddr in such a way as previously described in the back ground section of the specification, and acquires addresses of normal PHY layer devices which have returned HIGH level of the cell transmission allowance signal TxClav.

Figure 17:
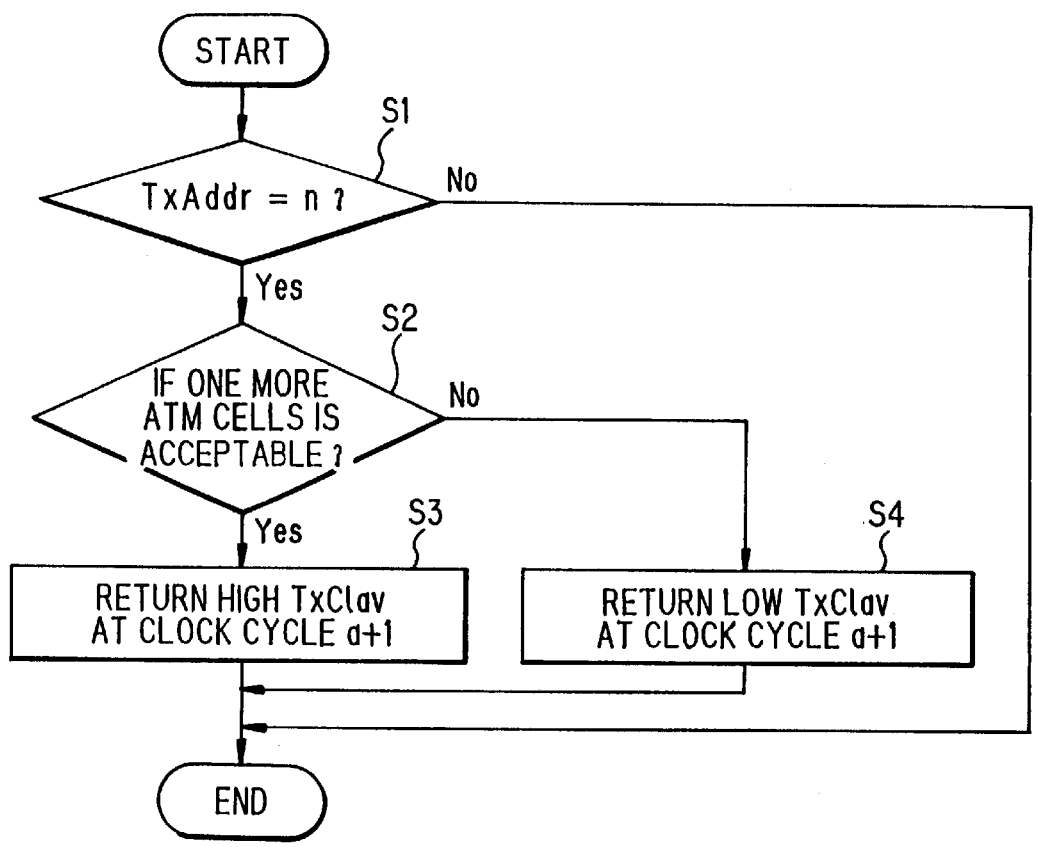
FIG. 17 is a flowchart illustrating driving operation of the cell transmission allowance signal TxClav performed by a normal PHY layer device defined in the Utopia Level 2.

As previously described in connection with FIG. 17, the normal PHY layer devices make HIGH the cell transmission allowance signal TxClav when they can accept at least one more whole ATM cell, and the HIGH level of the cell transmission allowance signal TxClav returned by the PHY layer device actually receiving cell data is valid only when it is made HIGH at last five clock cycles of the cell data transmission. Therefore, the cell transmission controller 10 of FIG. 1 performs polling of the PHY layer devices 2-0 to 2-M in such order that the PHY layer device actually receiving cell data can reply at one of the last five clock cycles of the cell data transmission.

On the other hand, when any of the FIFO memories 5-0 to 5-M becomes empty, it sends an empty signal 11 to the cell transmission controller 10.

From the polling results and the empty signals 11, the cell transmission controller 10 checks (at step S22) an output port OP-m, for every of m=0 to M, if it satisfies or not a third condition that the normal PHY layer device 2-m, whereto the concerning output port OP-m belongs, has made HIGH the cell transmission allowance signal TxClav, and at the same time, a fourth condition that the FIFO memory 5-m corresponding to the concerning output port OP-m is not empty.

When none of the output ports OP-0 to OP-M satisfies the above two condition, the cell transmission controller 10 performs nothing else at this cell transmission cycle. When there are found some output ports satisfying the third and the fourth conditions at the same time, the cell transmission controller 10 designates one selected output port among output ports satisfying them (at step S23) according to an appropriate algorithm, and delivers a cell selection command (at step S24) to the transmission cell selector 9, indicating to select a FIFO memory corresponding to the selected output port as the FIFO memory wherefrom cell data is to be outputted at the next cell transmission cycle.

Receiving the cell selection command, the transmission cell selector 9 selects the FIFO memory corresponding to the selected output port, for outputting cell data as the transmission cell data TxData at the next cell transmission cycle.

Then, at the last clock cycle (the 54-th clock cycle) of the current cell transmission cycle, the cell transmission controller 10 designates (at step S25) a normal PHY layer device which should receive the cell data at the next cell transmission cycle, by putting address of the normal PHY layer device whereto the selected output port belongs on the address signal TxAddr.

Thus, the next cell transmission cycle begins.

Figure 4:
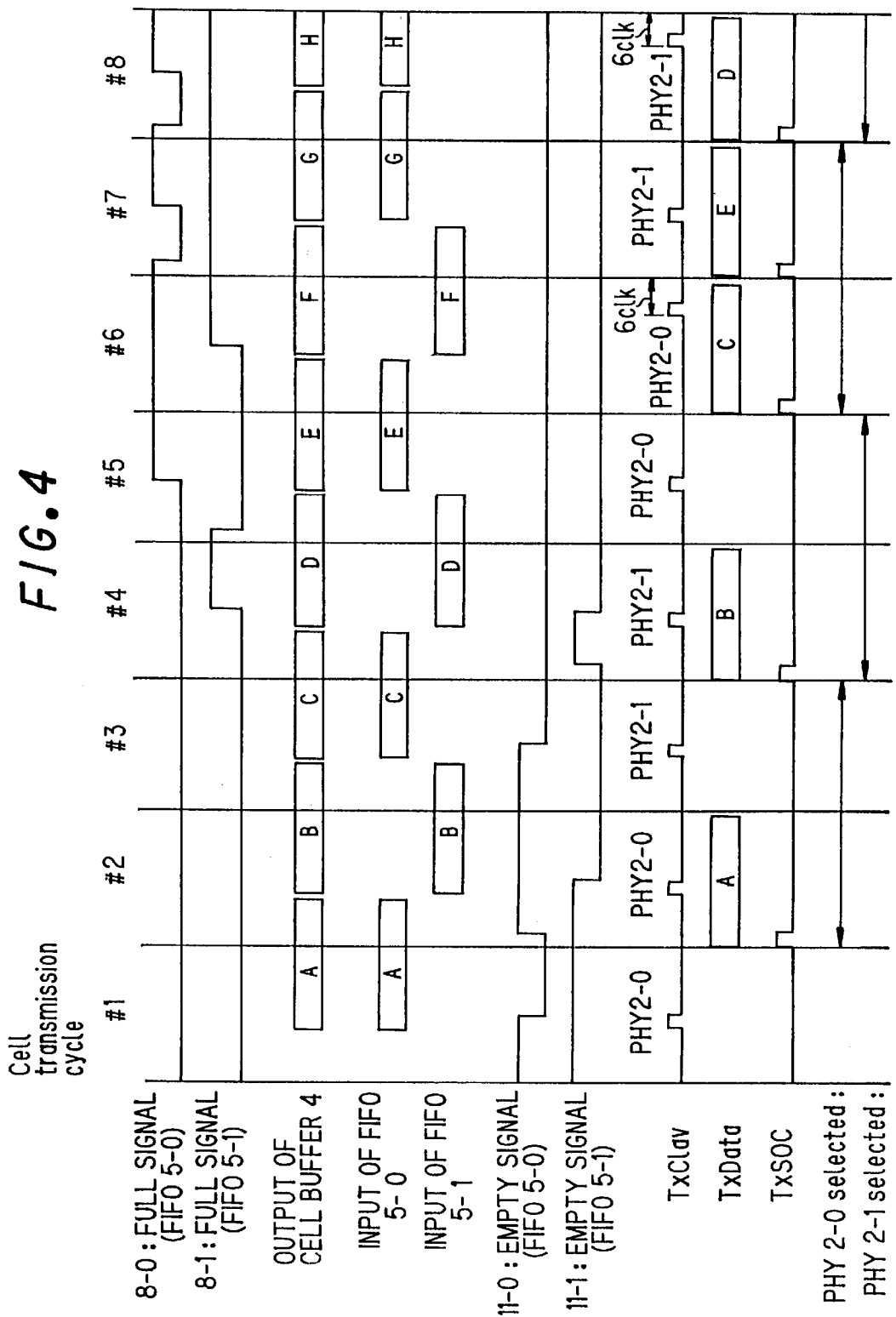
FIG. 4 is a timing chart illustrating a former part of an example of the cell transmission procedure of the ATM cell transmission system of FIG. 1.
Figure 5:
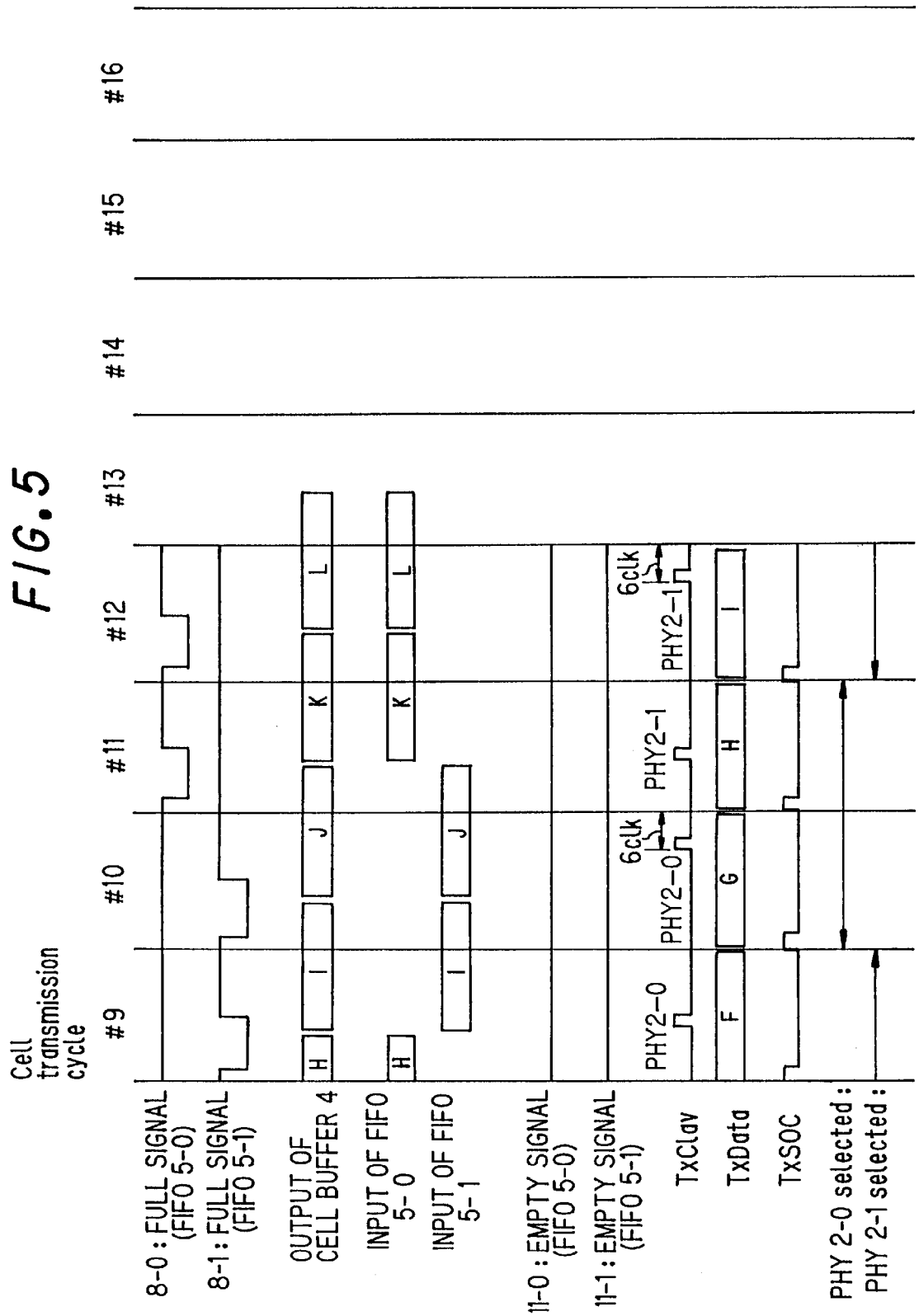
FIG. 5 is a timing chart illustrating the latter part of the example of the cell transmission procedure illustrated in FIG. 4.

FIGS. 4 and 5 are timing charts illustrating an example of the cell transmission procedure of the ATM cell transmission system of FIG. 1.

In the example of FIGS. 4 and 5, following conditions are assumed.

Only two normal PHY layer devices 2-0 and 2-1 having output port OP-0 and OP-1, respectively, are assumed to be comprised in the ATM cell transmission system, and hence, only two FIFO memories 5-0 and 5-1 are provided in the ATM layer device 1.

As to the imposed transmission delay condition above described of the ATM layer device 1, it is assumed that it takes more than four clock cycles and not more than one cell transmission cycle, that is, not more than 54 clock cycles, for the cell buffer 4 to output an ATM cell to the FIFO memory 5-0 or 5-1 after the output controller 5' begins to check if there is an output port satisfying the first and the second conditions at step S11 of FIG. 2.

The cell buffer 4 is assumed to have sufficient ATM cells to be forwarded to the output ports OP-0 and OP-1, and the check performed at step S22 of FIG. 3 by the cell transmission controller 10 whether there is an output port satisfying the third and the fourth conditions is assumed to be performed among last 6 clock cycles of each cell transmission cycle, that is, from a clock cycle whereby 44-th payload octet P 44 is transmitted until the last clock cycle whereby a next PHY layer device is designated.

Referring to FIG. 4, neither of the FIFO memories 5-0 and 5-1 asserts the full signal 8 (8-0 and 8-1 in FIGS. 4 and 5) at the beginning of a first cell transmission cycle #1, which means both the FIFO memories 5-0 and 5-1 can store one more ATM cell, and the cell buffer 4 is assumed to be storing ATM cells to be forwarded to the output ports OP-0 and OP-1. Hence, the check result performed by the output controller 5' at step S11 of FIG. 2 becomes TRUE, both the output ports OP-0 and OP-1 satisfying the first and the second condition.

In the example, the output port OP-0 is selected at step S12 of FIG. 2 and an ATM cell A is output from the cell buffer 4 to be inputted to the FIFO memory 5-0, at the first cell transmission cycle #1.

Receiving the ATM cell A, the FIFO memory 5-0 disables its empty signal 11 (11-0 in FIGS. 4 and 5).

Here, it is also assumed that the input speed of the cell data to the FIFO memories 5-0 and 5-1 is not slower than the output speed of cell data therefrom.

Meantime, the cell transmission controller 10 performs polling of the PHY layer devices 2-0 and 2-1 in parallel with the cell transfer performed by the output controller 5', and the PHY layer device 2-0 returns HIGH level of the cell transmission allowance signal TxClav at a clock cycle of the first cell transmission cycle #1, in the example of FIG. 4.

Therefore, at last six clock cycles of the first cell transmission cycle #1, the cell transmission controller 10 decides to transmit cell data toward the output port OP-0 at next cell transmission cycle and indicates the transmission cell selector 9 to select the corresponding FIFO memory 5-0, designating the PHY layer device 2-0 at the last clock cycle of the first cell transmission cycle #1.

At a second cell transmission cycle #2, the FIFO memory 5-0 is selected by the transmission cell selector 9 and the ATM cell A is output and transmitted as the transmission cell data TxData to the PHY layer device 2-0, and meantime another ATM cell B to be forwarded to the output port OP-1 is transferred from the cell buffer 4 to the FIFO memory 5-1, in the same way as above described.

Thus, the cell transmission is performed in a similar way at the following cell transmission cycles, as illustrated extending to FIG. 5.

Here, it is to be noted that an ATM cell E, which is transferred from the cell buffer 4 to the FIFO memory 5-0 after another ATM cell D is transferred to the FIFO memory 5-1, is transmitted as the transmission cell data TxData at the seventh cell transmission cycle #7, preceding the ATM cell D which is transmitted at the eighth cell transmission cycle #8. This is because the normal PHY layer device 2-1 has not returned HIGH level of the cell transmission allowance signal TxClav in the sixth cell transmission cycle #6 and the other normal PHY layer device 2-0 has returned the HIGH level of the cell transmission allowance signal TxClav at beginning of the last six clock cycles of the sixth cell transmission cycle #6.

As heretofore described, in the ATM cell transmission system of FIG. 1 according to the first embodiment of the invention, cell blocking called the HOL (Head of Line) blocking, wherein a cell stored in a FIFO memory is blocked to be outputted until another cell formerly inputted in the FIFO memory is outputted, is prevented, and accordingly, a high transmission efficiency is attained, by providing a FIFO memory for each one of the output ports.

Figure 6:
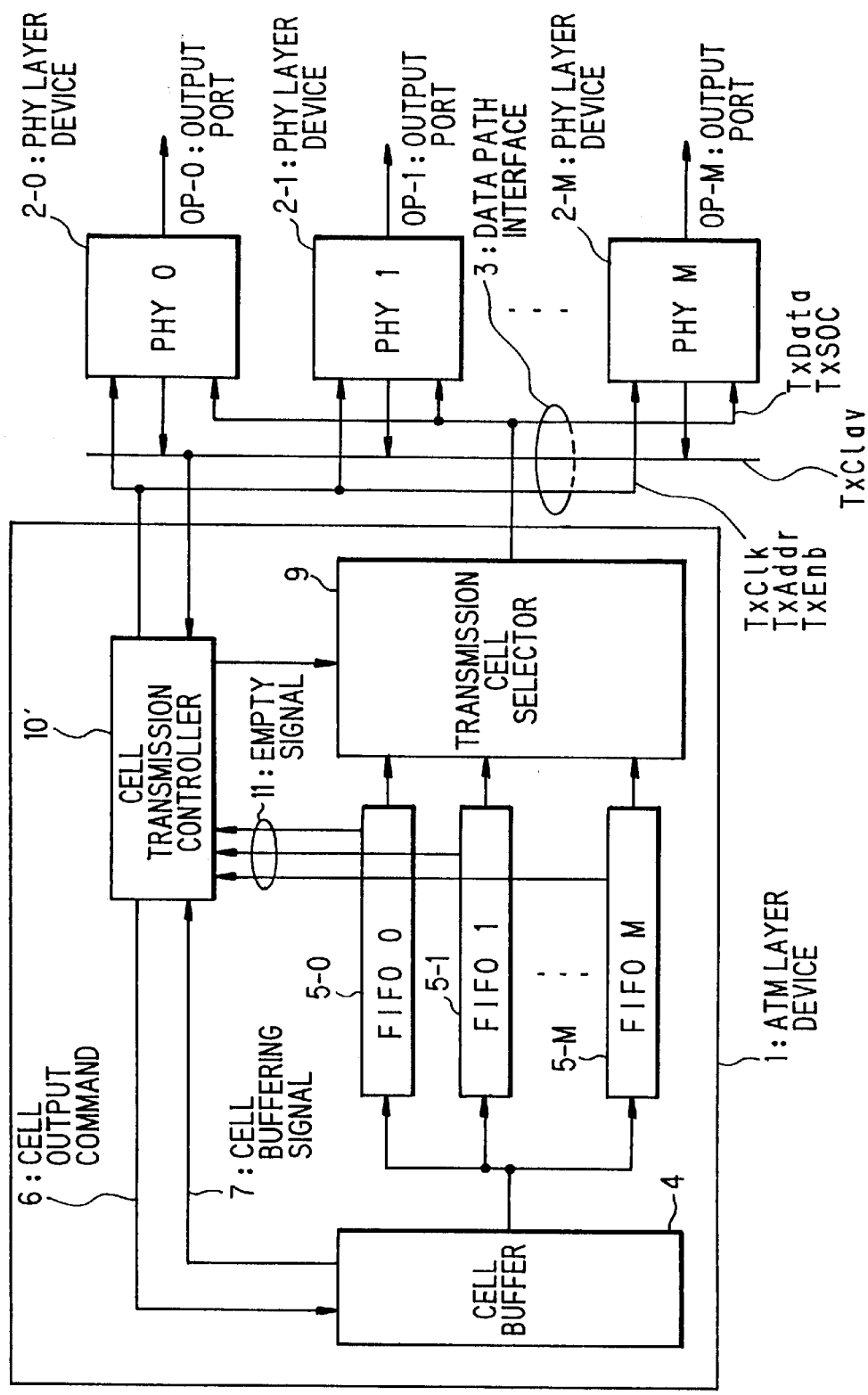
FIG. 6 is a block diagram illustrating another ATM cell transmission system according to a second embodiment of the invention.

FIG. 6 is a block diagram illustrating another ATM cell transmission system according to a second embodiment of the invention.

As can be seen from FIG. 6, the ATM cell transmission system of the second embodiment has the same configuration with the ATM cell transmission system of FIG. 1, except that a cell transmission controller 10' is provided in the ATM layer device 1 in place of the output controller 5' and the cell transmission controller 10 of FIG. 1.

In the ATM layer device 1 of FIG. 6, the cell bufferring signal 7 from the cell buffer 4 is delivered to the cell transmission controller 10', and the cell buffer 4 outputs ATM cells to the FIFO memories 5-0 to 5-M in accordance with the cell output command 6 outputted from the cell transmission controller 10', and the ATM cells stored in the FIFO memories 5-0 to 5-M are selected by the transmission cell selector 9 and transmitted by way of the data path interface 3, according to the cell selection signal delivered from the cell transmission controller 10' in the same way with the ATM layer device 1 of FIG. 1.

The cell transmission controller 10' is notified of presence in the cell buffer 4 of the ATM cell to be forwarded to each of the output ports OP-0 to OP-M by the cell buffering signal 7, and notified of presence in each of the FIFO memories 5-0 to 5-M of the ATM cell to be forwarded to respective one of the output port OP-0 to OP-M by the empty signals 11. Furthermore, the cell transmission controller 10' acquires information of the normal PHY layer devices 2-0 to 2-M concerning acceptability of one more whole ATM cell by performing polling of the PHY layer devices 2-0 to 2-M and checking the cell transmission allowance signal TxClav in the same way with the cell transmission controller 10 of FIG. 1.

Figure 7:
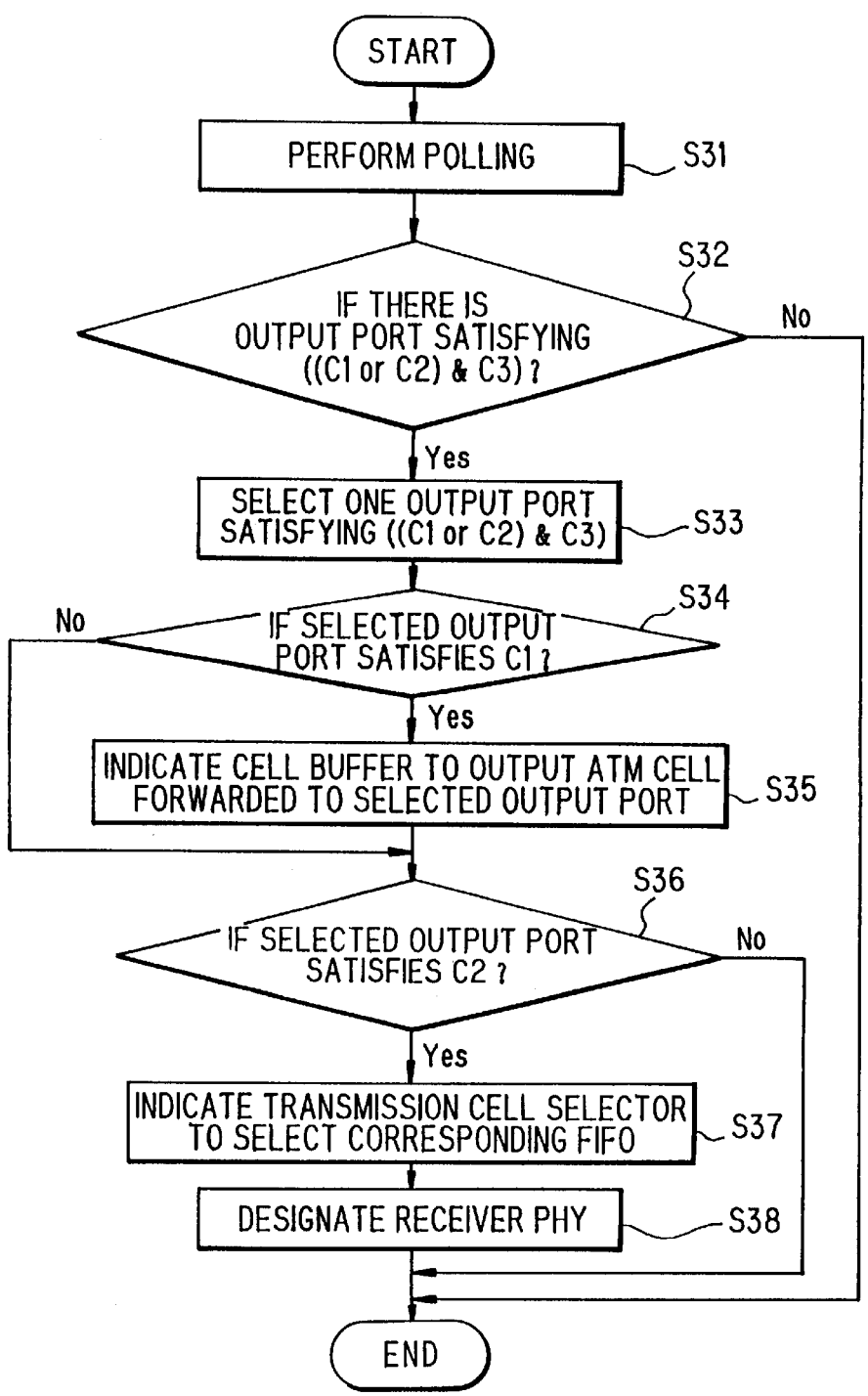
FIG. 7 is a flowchart illustrating operation of the cell transmission controller 10' of FIG. 6.

FIG. 7 is a flowchart illustrating operation of the cell transmission controller 10' of FIG. 6.

The cell transmission controller 10' performs polling of the PHY layer devices 2-0 to 2-M (at step S31) in a cell transmission cycle making use of the address signal TxAddr in the same way as beforehand described, and acquires addresses of normal PHY layer devices which have returned HIGH level of the cell transmission allowance signal TxClav.

As described in connection with FIG. 17, the normal PHY layer devices make HIGH the cell transmission allowance signal TxClav when they can accept at least one more whole ATM cell, and the HIGH level of the cell transmission allowance signal TxClav returned by the PHY layer device actually receiving cell data is valid only when it is made HIGH at last five clock cycles of the cell data transmission. Therefore, the cell transmission controller 10' of FIG. 6 also performs polling of the PHY layer devices 2-0 to 2-M in such order that the PHY layer device actually receiving cell data can reply at one of the last five clock cycles of the cell data transmission.

Then, at step S32, the cell transmission controller 10' checks for every of m=0 to M if the output port OP-m satisfies or not either of a first condition (C1) and a second condition (C2) together with a third condition (C3).

Here, the first condition is that at least one ATM cell to be forwarded to the output port OP-m is stored in the cell buffer 4;

the second condition is that the empty signal 11 is not enabled by the FIFO memory 5-m corresponding to the output port OP-m, that is, cell data of an ATM cell to be forwarded to the output port OP-m is stored in the FIFO memory 5-m; and the third condition is that the PHY layer device 2-m whereto the output port OP-m belongs has returned HIGH level of the cell transmission allowance signal TxClav.

If any of the output port OP-0 to OP-M does not satisfy the third condition, or satisfies neither of the first nor the second condition even if it satisfies the third condition, the cell transmission controller 10' performs nothing else in the cell transmission cycle.

If there is found at least one output port which satisfies either the first or the second condition together with the third condition, the cell transmission controller 10' designates one of them as the selected output port (at step S33) according to an appropriate algorithm.

Then, the cell transmission controller 10' checks (at step S34) whether the selected output port satisfies the above first condition. When there is any ATM cell to be forwarded to the selected output port, the cell transmission controller 10' indicates the cell buffer 4 to output the ATM cell to corresponding one of the FIFO memories 5-0 to 5-M by way of the cell output command 6 (at step S35) and performs step S36, while otherwise, the cell transmission controller 10' performs the step S36 directly.

At the step S36, the cell transmission controller 10' checks whether the selected output port satisfies or not the above second condition, that is, whether there is stored or not cell data of the ATM cell to be forwarded to the selected output port in the corresponding FIFO memory.

When the selected output port satisfies the second condition, the cell transmission controller 10' indicates the transmission cell selector 9 to select the corresponding FIFO memory by the cell selection command (at step S37), whereby the transmission cell selector 9 selects the FIFO memory for outputting cell data as the transmission cell data TxData of the next cell transmission cycle, and finally, at the last clock cycle (the 54-th clock cycle) of the current cell transmission cycle, the cell transmission controller 10 designates (at step S38) a normal PHY layer device which should receive the cell data at the next cell transmission cycle, by putting address of the normal PHY layer device whereto the selected output port belongs on the address signal TxAddr.

When the selected output port is found not to satisfy the second condition at step S36, the cell transmission controller 10' ends its procedure of the current cell transmission cycle without performing anything else.

Figure 8:
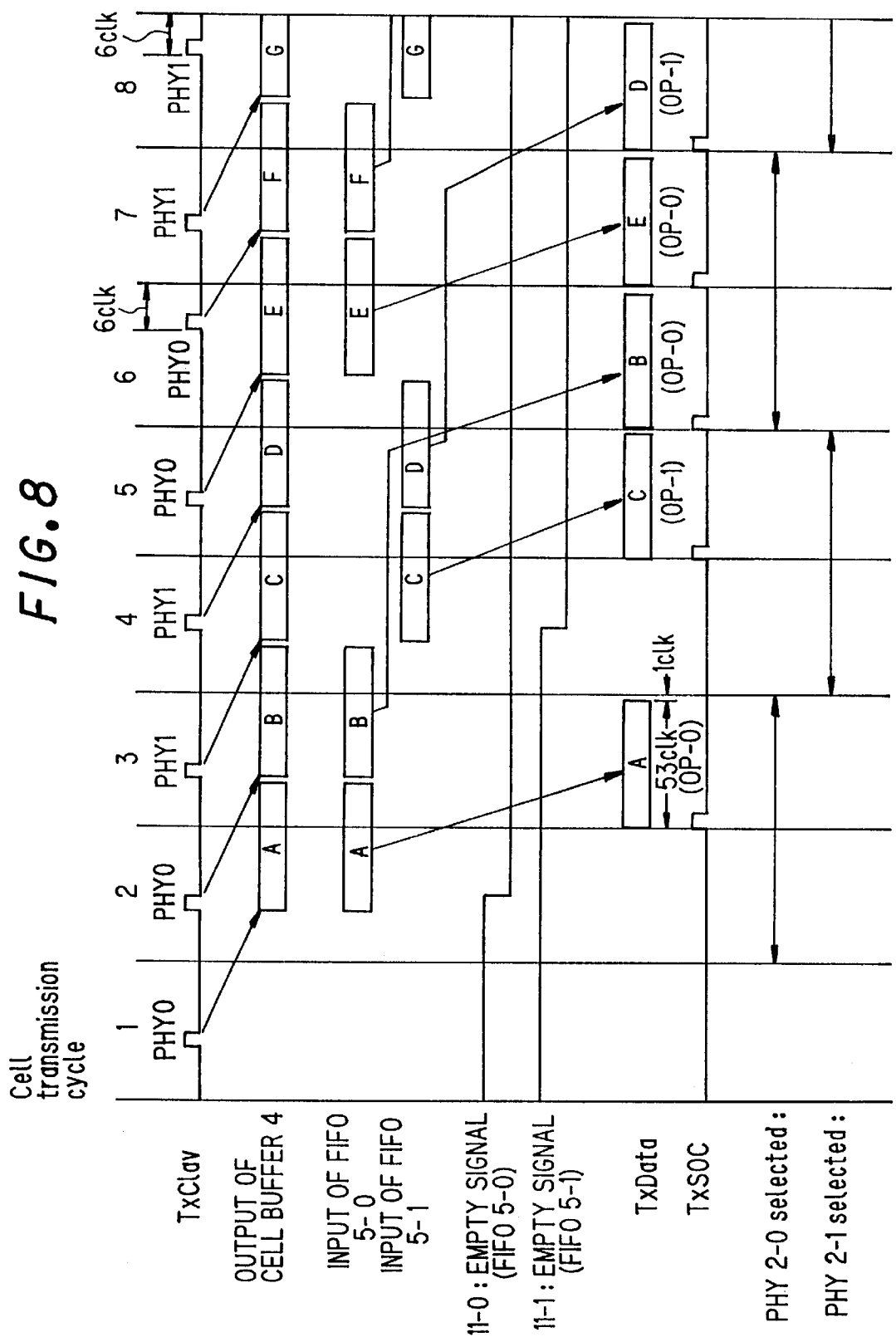
FIG. 8 is a timing chart illustrating an example of the cell transmission procedure of the ATM cell transmission system of FIG. 6.

FIG. 8 is a timing chart illustrating an example of the cell transmission procedure of the ATM cell transmission system of FIG. 6.

In the example of FIG. 8, similar conditions as assumed in FIGS. 4 and 5 are assumed as follows.

Only two normal PHY layer devices 2-0 and 2-1 having output port OP-0 and OP-1, respectively, are comprised in the ATM cell transmission system, and hence, only two FIFO memories 5-0 and 5-1 are provided in the ATM layer device 1, the cell buffer 4 has sufficient ATM cells to be forwarded to the output ports OP-0 and OP-1, and the checks at steps S32, S34 and S36 of FIG. 7 is performed by the cell transmission controller 10' among last 6 clock cycles of each cell transmission cycle, that is, from a clock cycle whereby 44-th payload octet P44 is transmitted until the last clock cycle whereby next PHY layer device is designated.

Referring to FIG. 8, in reply to the polling performed at a first cell transmission cycle #1, only the PHY layer device 2-0 returns HIGH level of the cell transmission allowance signal TxClav, and the cell transmission controller 10' knows only the PHY layer device 2-0 can accept data of a whole ATM cell. The empty signals 11 of both the FIFO memories 5-0 and 5-1 are at HIGH level at the first cell transmission cycle #1.

ATM cells to be forwarded to the output ports OP-0 and OP-1 being stored in the cell buffer 4, the check result at step S32 of FIG. 7 becomes TRUE and the output port OP-0 is designated as the selected output port at step S33. Hence, the cell transmission controller 10' indicates the cell buffer 4 to output an ATM cell A to be forwarded to the output port OP-0 at step S35.

At the second cell transmission cycle #2, the ATM cell A is transferred to the FIFO memory 5-0, and at the same time, the cell transmission controller 10' indicates the cell buffer 4 to output another ATM cell B forwarded to the output port OP-0 into the FIFO memory 5-0, because also at the second cell transmission cycle #2, only the PHY layer device 2-0 returns HIGH level of the cell transmission allowance signal TxClav.

At the third cell transmission cycle #3, the ATM cell B is transferred from the cell buffer 4 to the FIFO memory 5-0, and at the same time the cell transmission controller 10' indicates the cell buffer 4 to output an ATM cell C forwarded to the output port OP-1 into the FIFO memory 5-1, since the PHY layer device 2-1 returns HIGH level of the cell transmission allowance signal TxClav at the third cell transmission cycle #3.

Furthermore, the ATM cell A stored in the FIFO memory 5-0 is transmitted to the PHY layer device 2-0 as the transmission cell data TxData at the third cell transmission cycle #3. This is because the PHY layer device 2-0 has returned the HIGH level of the cell transmission allowance signal TxClav at the second cell transmission cycle #2, and the empty signal 11 (11-0) of the FIFO memory 5-0 was disabled at last six clock cycles of the second cell transmission cycle, making TRUE the check result at step S36 of FIG. 7. Therefore, the cell transmission controller 10' indicated the transmission cell selector 9 to select the FIFO memory 5-0 and designated the PHY layer device 2-0 as the receiver of the transmission cell data TxData, at the last clock cycle the second cell transmission cycle #2.

Thus, the cell transmission is performed in a similar way at the following cell transmission cycles #4, #5 and so on, as illustrated in FIG. 8.

Here, in the example of FIG. 8, the ATM cell C is transmitted from the FIFO memory 5-1 to the PHY layer device 2-1 at the fifth cell transmission cycle #5 preceding the ATM cell B which is outputted from the cell buffer 4 before the ATM cell B, and transmitted to the PHY layer device 2-0 at the sixth cell transmission cycle #6. This is because the HIGH level of the cell transmission signal TxClav was not returned from the PHY layer device 2-0 at the fourth cell transmission cycle #4. The situation is the same between an ATM cell E which is transmitted to the PHY layer device 2-0 at the seventh cell transmission cycle #7 just following the ATM cell B, and an ATM cell D which is transmitted to the PHY layer device 2-1 at the eighth cell transmission cycle #8.

As heretofore described, also in the ATM cell transmission system of FIG. 6 according to the second embodiment of the invention, the HOL blocking of the cell data is prevented by providing a FIFO memory for each one of the output ports, and accordingly, a high transmission efficiency is attained.

Figure 9:
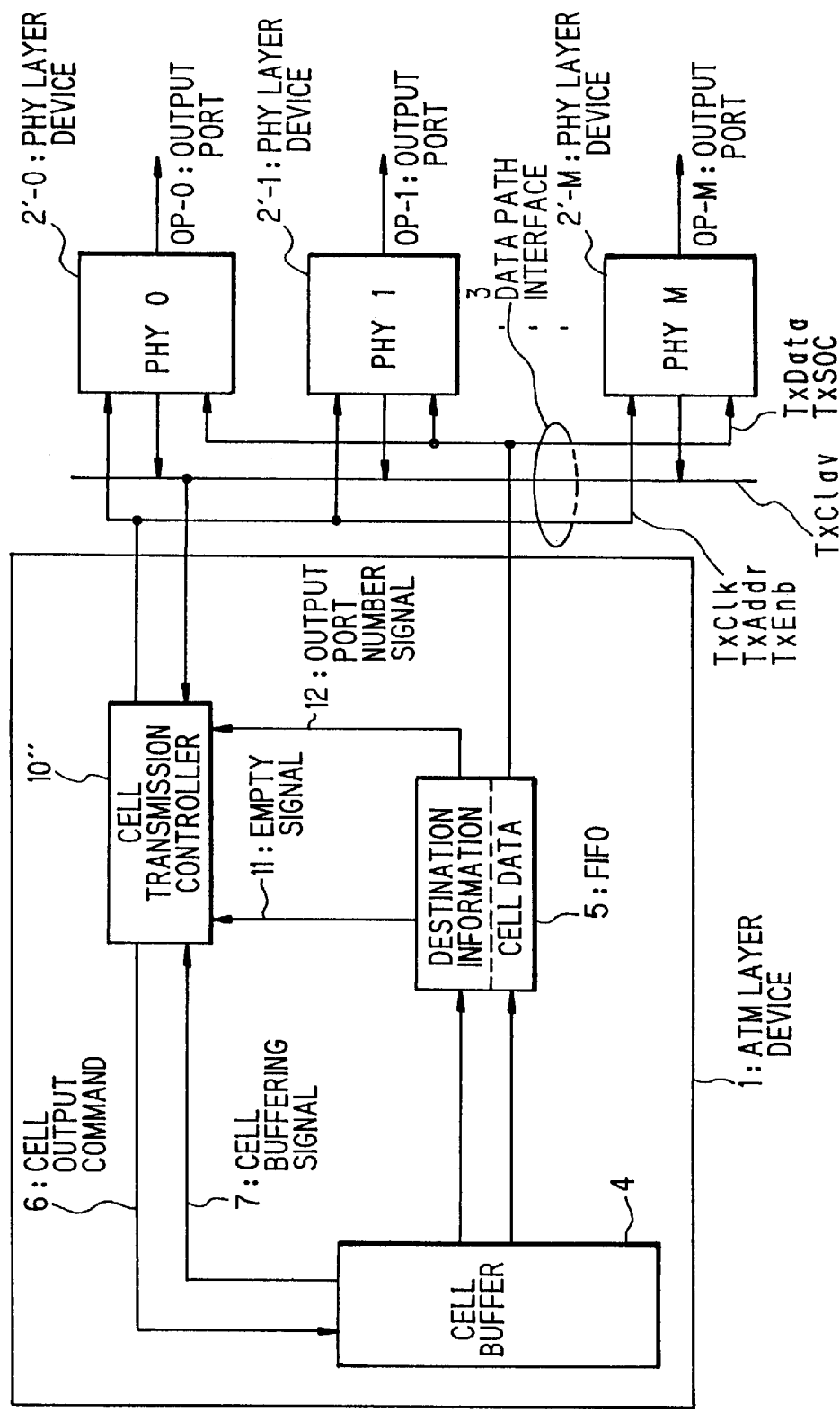
FIG. 9 is a block diagram illustrating another ATM cell transmission system according to a third embodiment of the invention.

FIG. 9 is a block diagram illustrating another ATM cell transmission system according to a third embodiment of the invention.

In the ATM cell transmission system of the third embodiment, a plurality of enhanced PHY layer devices 2'-0 to 2'-M are connected to the data path interface 3 in place of the normal PHY layer devices 2-0 to 2-M of FIG. 6 or FIG. 1, and the ATM layer device 1 comprises a single FIFO memory 5 provided in place of the FIFO memories 5-0 to 5-M, a cell buffer 4 and a cell transmission controller 10" connected to the cell buffer 4 and the FIFO memory 5.

The normal PHY layer device is defined to return HIGH level of the cell transmission allowance signal TxClav on condition it can accept at least one more whole ATM cell, in the Utopia Level 2 specification.

On the other hand, the enhanced PHY layer device defined in the Utopia Level 2 specification returns the HIGH level of the cell transmission allowance signal TxClav on condition it can accept at least K whole ATM cells besides cell data actually receiving, if there is any, K being an integer more than one.

The cell buffer 4 delivers the cell buffering signal 7 to the cell transmission controller 10' in the same way with the cell buffer 4 of FIG. 6, and outputs an ATM cell having a destination indicated in the cell output command 6 to the FIFO 5 together with destination information of the ATM cell, that is, a port number of one of the output ports OP-0 to OP-M each belonging respective one of the enhanced PHY layer devices 2'-0 to 2'M, in accordance with the cell output command 6 delivered from the cell transmission controller 10".

The ATM cell inputted to the FIFO memory 5 is outputted together with its destination information, whereof cell data is transmitted through the data path interface 3 as the transmission cell data TxData, and the destination information is inputted to the cell transmission controller 10" as an output port number signal 12 when the empty signal 11 is disabled.

Differently from the first and the second embodiment, the ATM cell stored in the FIFO memory 5 does not wait for being selected by the transmission cell selector 9 of FIG. 1 or FIG. 6 which is controlled by the cell transmission controller 10 or 10', in the ATM layer device 1 of FIG. 9 according to the third embodiment of the invention.

The cell buffer 4 delivers the cell buffering signal 7 to the cell transmission controller 10'', and the FIFO memory 5 enables the empty signal 11 when it becomes empty. The cell transmission controller 10'' knows presence of ATM cells in the cell buffer 4 to be forwarded to each one of the output ports OP-0 to OP-M from the cell buffering signal 7, and presence of cell data of an ATM cell prepared in the FIFO memory 5 to be transmitted through the data path interface 3 as the transmission cell data TxData from the empty signal 11.

Further, the cell transmission controller 10'' knows enhanced PHY layer devices which can accept at least K more ATM cells, by performing polling of the enhanced PHY layer devices 2'-0 to 2'-M.

Figure 10:
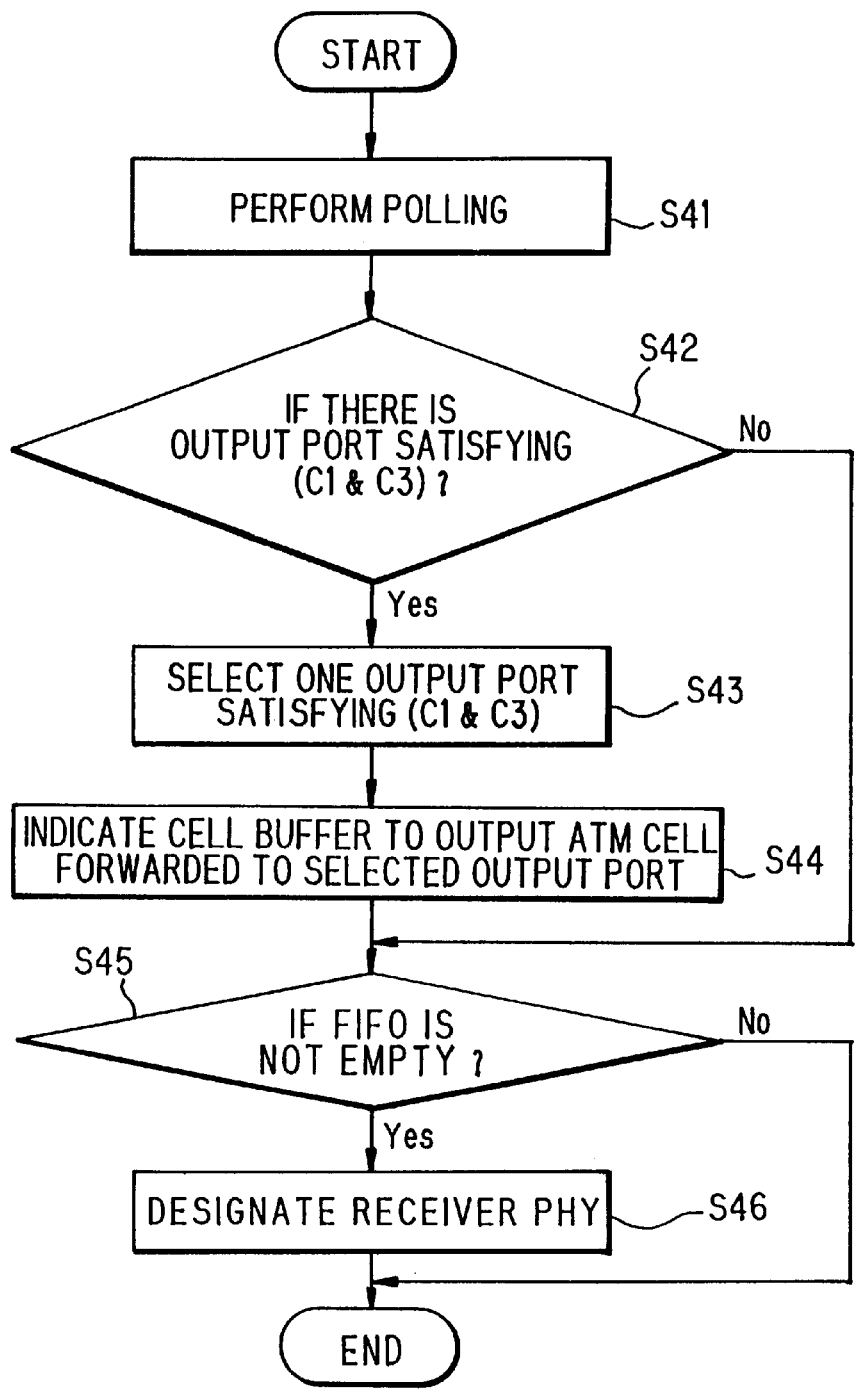
FIG. 10 is a flowchart illustrating operation of the cell transmission controller 10" of FIG. 9.

FIG. 10 is a flowchart illustrating operation of the cell transmission controller 10'' of FIG. 9.

Referring to FIG. 10, the cell transmission controller 10'' performs (at step S41) polling of the enhanced PHY layer devices 2'-0 to 2'-M at every cell transmission cycle by putting addresses thereof one by one on the address signal TxAddr, in the same way as described in connection with the first or the second embodiment, and knows the enhanced PHY layer devices which return HIGH level of the cell transmission allowance signal TxClav asserting to be able to accept at least K more ATM cells.

Then, the cell transmission controller 10'' checks (at step S42), for every of m=0 to M if the output port OP-m satisfies a first condition that at least one ATM cell to be forwarded to the output port OP-m is stored in the cell buffer 4, and a second condition that the enhanced PHY layer device 2'-m whereto the output port OP-m belongs has returned HIGH level of the cell transmission allowance signal TxClav.

If there is found at least one output port which satisfies both the first and the second condition, the cell transmission controller 10'' designate one of them as a selected output port (at step S43) according to an appropriate algorithm, and indicates (at step S44) the cell buffer 4 to output an ATM to be forwarded to the selected output port into the FIFO memory 5, before proceeding to step S45.

When no output port is found to satisfy the first and the second condition at step S42, the cell transmission controller 10'' proceeds directly to the step S45 without performing steps S43 and S44.

At the step S45, the cell transmission controller 10'' checks whether the empty signal 11 is enabled or not by the FIFO memory 5. When the empty signal 11 is enabled, the cell transmission controller ends its procedure of the current cell transmission cycle without performing nothing else.

When the empty signal 11 is confirmed to be disabled, which means there is stored cell data of an ATM cell in the FIFO memory 5 prepared to be transmitted, the cell transmission controller 10'' puts an address of the enhanced PHY layer device accommodating the output port notified from the FIFO memory 5 by way of the output port number signal 12 (at step S46), on the address signal TxAddr at the last (54-th) clock cycle of the current cell transmission cycle, for designating the enhanced PHY layer device as the receiver of the transmission cell data TxData of next cell transmission cycle.

Figure 11:
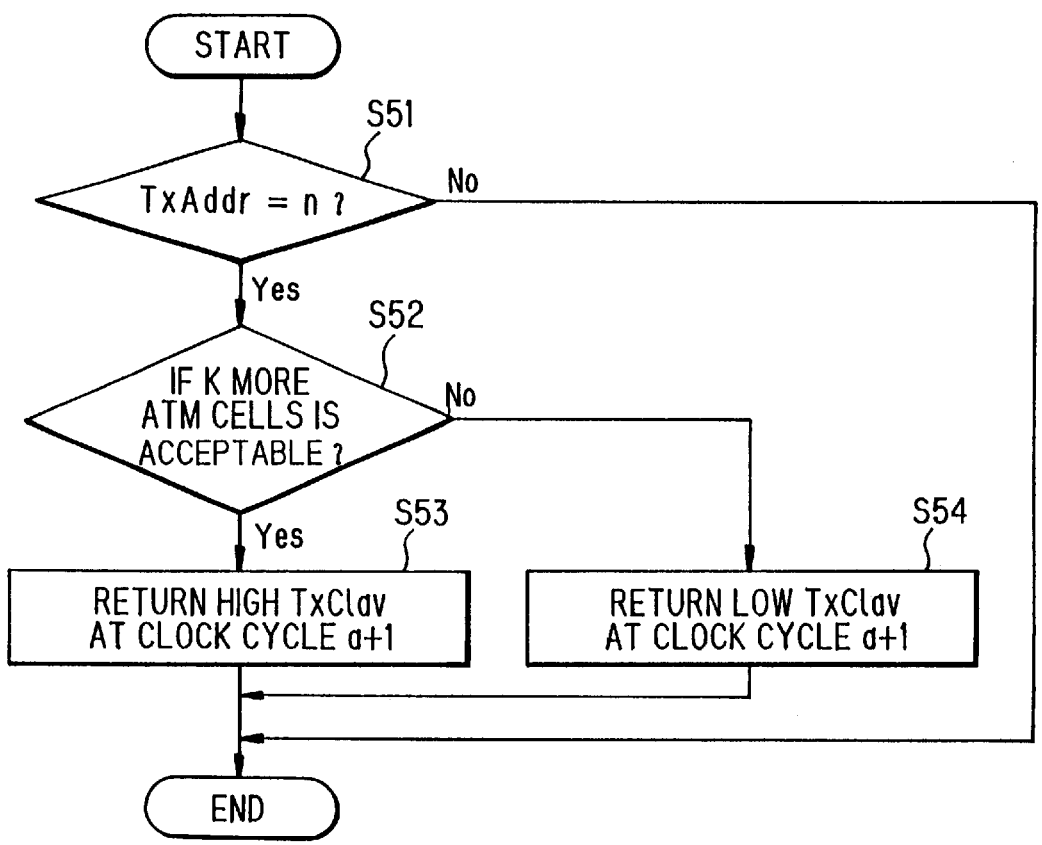
FIG. 11 is a flowchart illustrating operation of an enhanced PHY layer device 2-n assigned an address n performed in response to the polling from the cell transmission controller 10"

FIG. 11 is a flowchart illustrating operation of an enhanced PHY Layer device 2'-n assigned an address n performed in response to the polling from the cell transmission controller 10''.

When, at a clock cycle a, an address is put on the address signal TxAddr, the enhance PHY layer device 2'-n checks (at step S51) whether the address is n or not. When the check result is TRUE, the enhanced PHY layer device 2'-n checks (at step S52) whether it can accept at least K more ATM cells or not, besides cell data actually receiving when it is receiving cell data. When the check result at step S52 is TRUE, the enhanced PHY layer device 2'-n drives the cell transmission allowance signal TxClav to HIGH level (at step S53), and otherwise drives it to LOW level (at step S54), at the next clock cycle a+1.

When the check result at step S51 is FALSE, the enhanced PHY layer device 2'-n ends the procedure leaving the cell transmission allowance signal TxClav driven by another PHY layer device.

Figure 12:
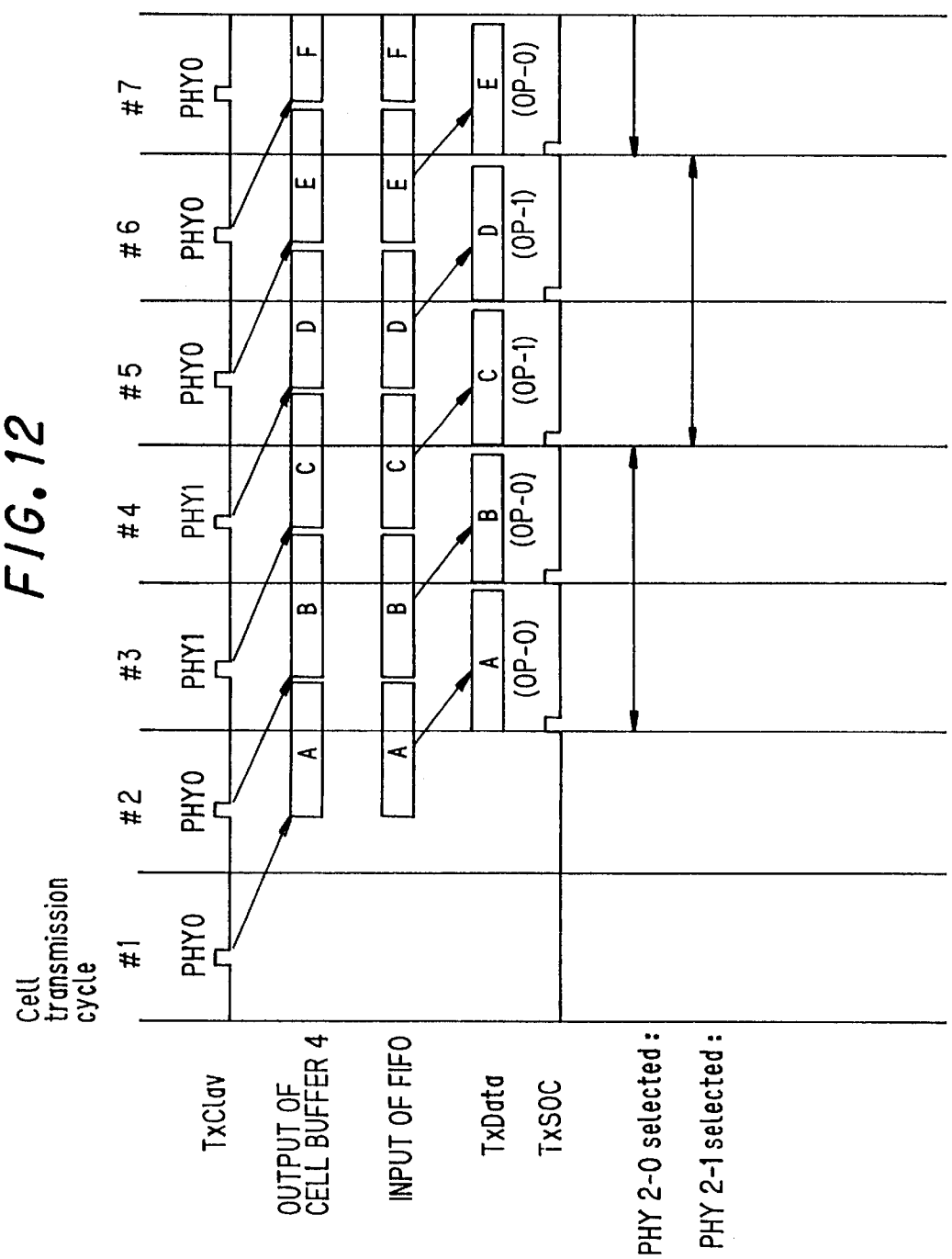
FIG. 12 is a timing chart illustrating an example of the cell transmission procedure of the ATM cell transmission system of FIG. 9.

FIG. 12 is a timing chart illustrating an example of the cell transmission procedure of the ATM cell transmission system of FIG. 9 according to the third embodiment.

Also in the example of FIG. 11, similar conditions as assumed in FIG. 8 are assumed, that is, only two enhanced PHY layer devices 2'-0 and 2'-1 having output port OP-0 and OP-1, respectively, are comprised in the ATM cell transmission system, the cell buffer 4 has sufficient ATM cells to be forwarded to the output ports OP-0 and OP-1, and the checks at steps S42 and S45 of FIG. 10 is performed by the cell transmission controller 10'' among last 6 clock cycles of each cell transmission cycle, that is, from a clock cycle whereby 44-th payload octet P44 is transmitted until the last clock cycle whereby next enhanced PHY layer device is designated.

In the example of FIG. 12, the FIFO memory 5 is empty at the beginning of a first cell transmission cycle #1.

Referring to FIG. 12, in reply to the polling performed at the first cell transmission cycle #1, only the enhanced PHY layer device 2'-0 returns HIGH level of the cell transmission allowance signal TxClav, and the cell transmission controller 10'' knows the enhanced PHY layer device 2'-0 can accept data of at least K more whole ATM cells.

ATM cells to be forwarded to the output ports OP-0 and OP-1 being stored in the cell buffer 4, the check result at step S42 of FIG. 10 becomes TRUE and the output port OP-0 is designated as the selected output port at step S43. Thus, the cell transmission controller 10'' indicates the cell buffer 4 to output an ATM cell A to be forwarded to the output port OP-0 at step S44 of FIG. 10.

At the second cell transmission cycle #2, the ATM cell A is transferred to the FIFO memory 5, and at the same time, the cell transmission controller 10'' indicates the cell buffer 4 to output another ATM cell B forwarded to the output port OP-0 into the FIFO memory 5, because also at the second cell transmission cycle #2, only the enhanced PHY layer device 2'-0 returns HIGH level of the cell transmission allowance signal TxClav.

At the third cell transmission cycle #3, the ATM cell B is transferred from the cell buffer 4 to the FIFO memory 5, and at the same time the cell transmission controller 10'' indicates the cell buffer 4 to output an ATM cell C forwarded to the output port OP-1 into the FIFO memory 5, since the enhanced PHY layer device 2'-1 returns HIGH level of the cell transmission allowance signal TxClav at the third cell transmission cycle #3.

Furthermore, the ATM cell A stored in the FIFO memory 5 is transmitted from the. FIFO memory 5 to the enhanced PHY layer device 2'-0 as the transmission cell data TxData. This is because destination information of the ATM cell A was already stored in the FIFO memory 5 at the last six clock cycles of the preceding cell transmission cycle #2 together with begining part of the ATM cell A, and hence, the FIFO memory was not empty at the timing, giving the check result TRUE at step S45 of FIG. 10.

Thus, the cell transmission procedure is repeated as depicted in FIG. 12.

Here, at the fourth cell transmission cycle #4, the ATM cell B is transmitted to the enhanced PHY layer device 2'-0 which has returned LOW level of the cell transmission allowance signal TxClav to the polling performed at the preceding cell transmission cycle #3.

When the PHY layer device 2'-0 is a normal PHY layer device defined in the Utopia Level 2 specification, the PHY layer device 2'-0 may not accept the cell data of the ATM cell B. However, the enhanced PHY layer device 2'-0 can accept yet K−1 more whole ATM cells at the timing when it begins to return LOW level of the cell transmission allowance signal TxClav. Therefore, the enhanced PHY layer device 2'-0 can accept the ATM cell B at the fourth cell transmission cycle #4.

In the example of FIG. 12, the cell number K is designed to be K=2. Generally describing, the cell number K is to be designed as K≧D+1 in a case where D cell transmission cycles is needed for an ATM cell is outputted from the cell buffer 4 into the FIFO memory 5 after polling of the enhanced PHY layer devices 2'-0 to 2'-M at step S41 of FIG. 10 is performed.

As heretofore described, in the ATM cell transmission system of FIG. 9 according to the third embodiment of the invention, the ATM cells need not wait at FIFO memory 5 and therefore no HOL blocking of the cell data occurs, realizing a high transmission efficiency of the ATM cell transmission system. Furthermore, the ATM layer device 1 call be simply and economically configured with only one FIFO memory.

Figure 13:
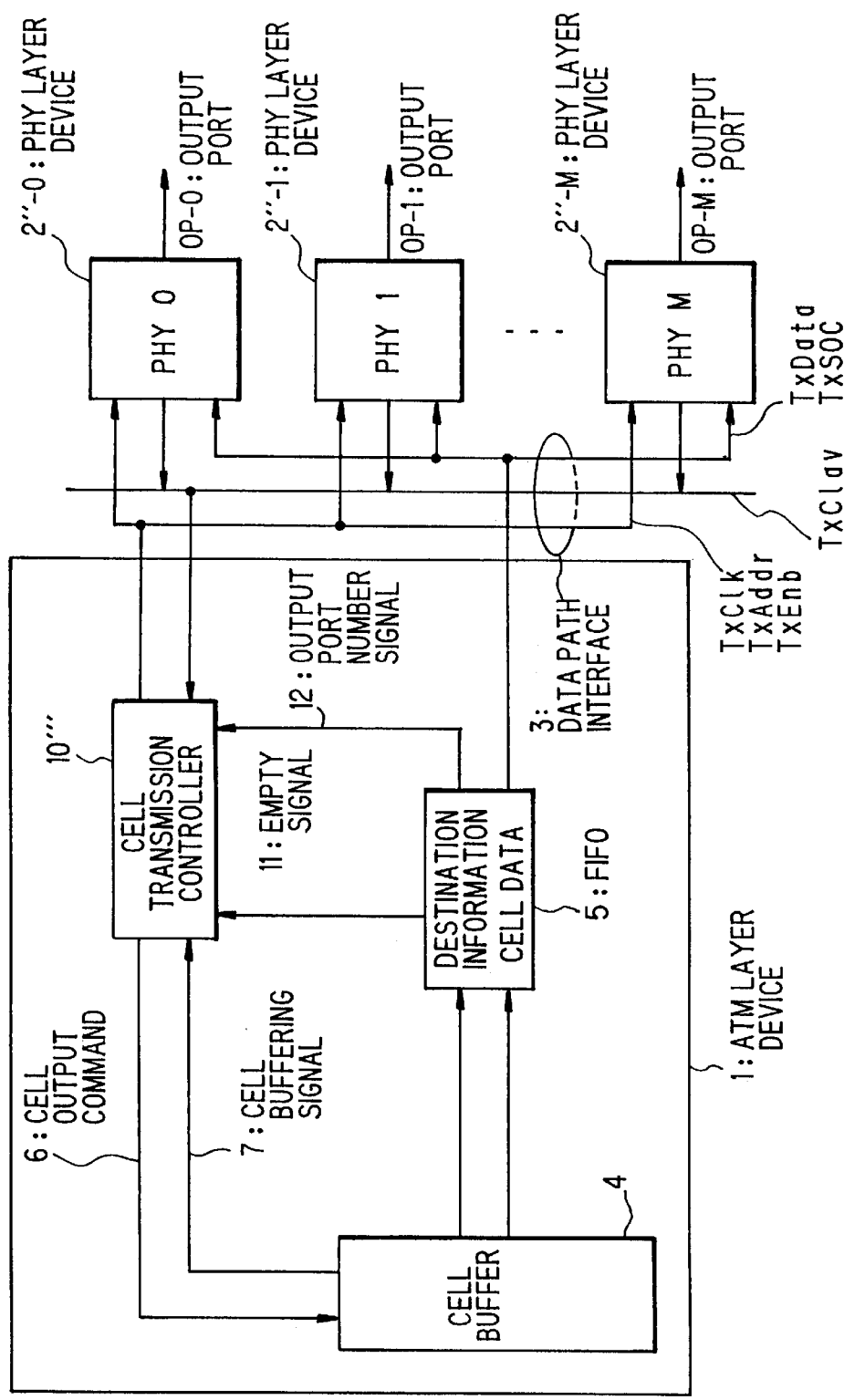
FIG. 13 is a block diagram illustrating an ATM cell transmission system according to a fourth embodiment of the invention.

FIG. 13 is a block diagram illustrating an ATM cell transmission system according to a fourth embodiment of the invention, which has the same configuration with the ATM cell transmission system of FIG. 9 except that the normal PHY layer devices and the enhanced PHY layer devices defined in the Utopia Level 2 specification are both connected mixed in parallel to the data path interface 3 and that the cell transmission controller 10'' is replaced with another cell transmission controller 10'''.

Figure 14:
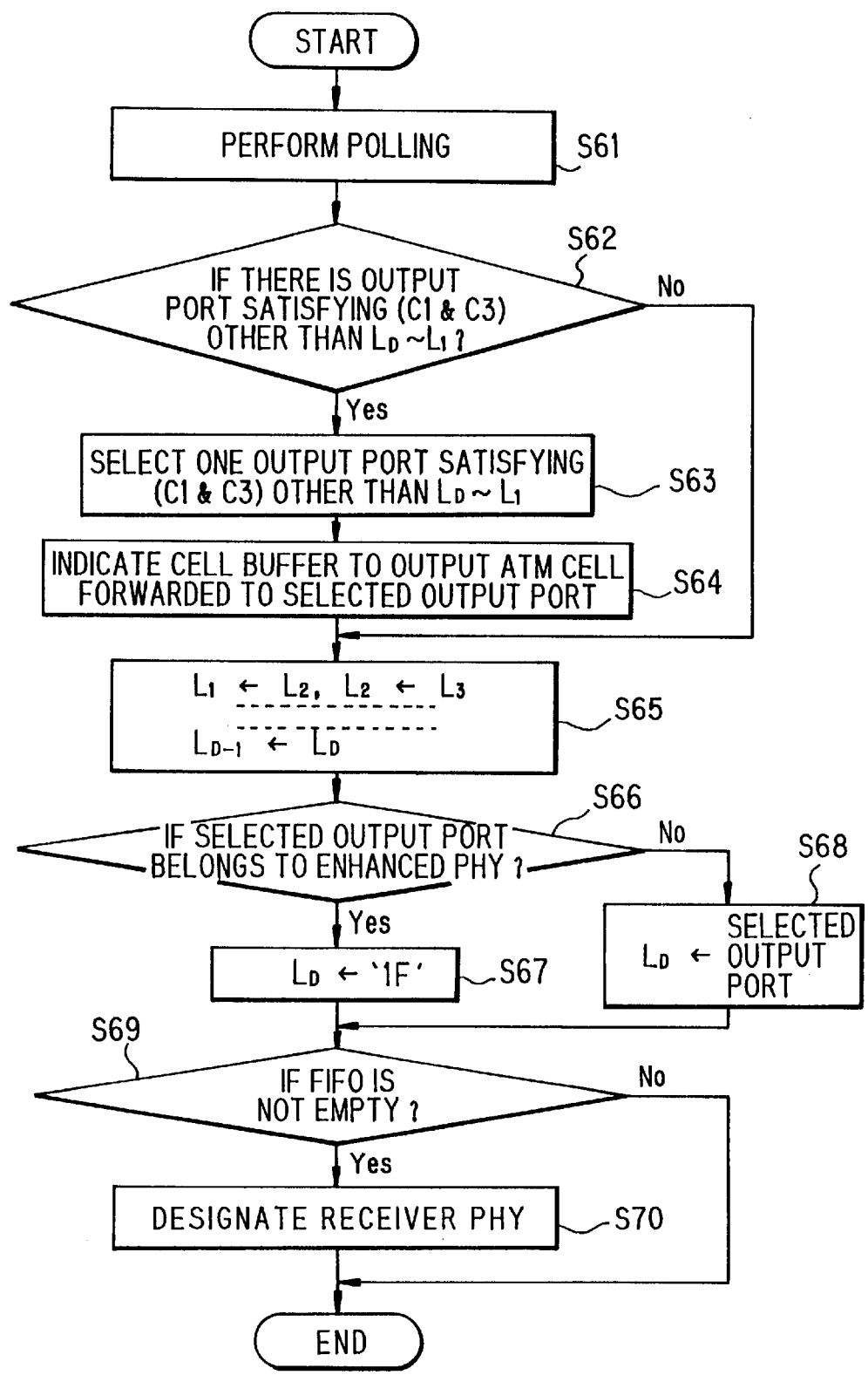
FIG. 14 is a flowchart illustrating operation of the cell transmission controller 10''' of FIG. 13.

FIG. 14 is a flowchart illustrating operation of the cell transmission controller 10''' of FIG. 13.

At every cell transmission cycle, the cell transmission controller 10''' performs (at step S61) polling of a plurality of PHY layer devices 2''-0 to 2''-M including the normal PHY layer devices and the enhanced PHY layer devices defined in the Utopia Level 2 specification. The normal PHY layer devices reply to the polling as described in connection with the flowchart of FIG. 17, the enhanced PHY layer devices reply to the polling as described in connection with the flowchart of FIG. 11, and the cell transmission controller 10''' knows addresses of the PHY layer devices returning HIGH level of the cell transmission allowance signal TxClav. The HIGH level of the cell transmission signal TxClav returned from the PHY layer device whereto cell data is actually transmitted is valid only when it is returned in the last five clocks of the cell transmission cycle. Therefore, the cell transmission controller 10''' polls the PHY layer devices so that the PHY layer device actually receiving the transmission cell data TxData can respond at the last five clock cycles of the cell transmission, in the same way with the other embodiments.

In the cell transmission controller 10''' of the fourth embodiment, D selected port numbers $L_D$ to $L_1$ are registered, D being a number of cell transmission cycles needed for an ATM cell is outputted from the cell buffer 4 into the FIFO memory 5 after polling at step S61 is performed.

The selected port numbers $L_D$ to $L_1$ represent normal PHY layer devices whereto selected output ports designated in the last D cell transmission cycles belongs, as follows. Each of the selected port numbers $L_D$ to $L_1$ is the address of PHY layer device whereto the respective selected output port belongs when the respective output port belongs to one of the normal PHY layer devices, and the address '1F' of the null PHY port when the respective selected output port belongs one of the enhanced PHY layer devices. The selected port numbers $L_D$ to $L_1$ are registered in a shift register, for example, provided in the cell transmission controller 10'''.

Returning to FIG. 14, the cell transmission controller 10''' checks (at step S62) for every of m=0 to M if the output port OP-m satisfies a first condition that the address of the corresponding PHY layer device 2''-m is not registered as any of the selected port numbers $L_D$ to $L_1$, a second condition that at least one ATM cell to be forwarded to the output port OP-m is stored in the cell buffer 4, and a third condition that the corresponding PHY layer device 2''-m whereto the output port OP-m belongs has returned HIGH level of the cell transmission allowance signal TxClav, at the same time.

If there is found at least one output port which satisfies all of the first, the second and the third condition, the cell transmission controller 10''' designate one of them as a selected output port (at step S63) according to an appropriate algorithm, and indicates (at step S64) the cell buffer 4 to output an ATM cell to be forwarded to the selected output port into the FIFO memory 5, before proceeding to step S65.

When no output port is found to satisfy all of the first, the second and the third condition at step S62, the cell transmission controller 10''' proceeds directly to the step S65 without performing steps S63 and S64.

At the step S65, the cell transmission controller 10''' shifts the selected port numbers $L_D$ to $L_2$ by one cell transmission cycle such as $L_1 \leftarrow L_2, L_2 \leftarrow L_3, \ldots, L_{D-1} \leftarrow L_D$.

Then, the cell transmission controller 10''' checks whether the selected output port belongs one of the enhanced PHY layer devices or not (at step S66). When it is TRUE, the cell transmission controller 10''' registers address '1F' of the null PHY port as the port number $L_D$ (at step S67), and otherwise, registers address of the corresponding normal PHY layer device as the port number $L_D$ (at step S68). Thus, addresses of the normal PHY layer devices whereto ATM cells are transmitted at preceding D cell transmission cycles are registered in the cell transmission controller 10'''.

Then (at step S69), the cell transmission controller 10''' checks whether the empty signal 11 is enabled by the FIFO memory 5 or not.

When it is enabled, the cell transmission controller 10''' ends its procedure at the current cell transmission cycle without performing nothing else. When it is not enabled, the cell transmission controller. 10''' puts the address of the PHY layer device notified from the FIFO memory 5 by way of the output port number signal 12, on the address signal TxAddr at the last (54-th) clock cycle of the current cell transmission cycle (at step S70), for designating the PHY layer device as the receiver of the transmission cell data TxData of the next cell transmission cycle.

As above described, the cell transmission controller 10''' checks the selected port numbers $L_D$ to $L_1$, that is, port numbers of normal PHY layer devices whereto cell data transmission after the last polling is already scheduled, and omits them from candidates of the selected output port to be designated at step S63. Therefore, cell loss on the data path interface 3, which might occur when cell data is transmitted to an PHY layer device unable to accept a whole ATM cell, can be prevented as well in the ATM transmission system of FIG. 13 according to the fourth embodiment of the invention.

As heretofore described, an ATM cell transmission system having a high transmission efficiency can be realized with a single FIFO memory 5 according to the fourth embodiment of the invention, even when normal PHY layer devices defined in the Utopia Level 2 specification are included in the PHY layer devices connected to the data path interface 3.

What is claimed is:

1. An ATM (Asynchronous Transfer Mode) cell transmission system having an ATM layer device, a data path interface and a plurality of normal PHY (Physical) layer devices whereof each is connected to the ATM layer device by way of the data path interface and returns a HIGH level of a cell transmission allowance signal on condition said each can accept one more whole ATM cell when said each is polled by the ATM layer device through the data path interface; said ATM layer device comprising:

a cell buffer for storing ATM cells to be transmitted through the normal PHY layer devices;

FIFO memories each provided corresponding to each one of the normal PHY layer devices;

an output controller for controlling the cell buffer to output an ATM cell to be transmitted through one of the normal PHY layer devices into one of the FIFO memories corresponding to said one of the normal PHY layer devices, on condition that the ATM cell is stored in the cell buffer and said one of the FIFO memories is not full;

a transmission cell selector for selecting one of the FIFO memories as a next sender for transmitting cell data through the data path interface at a next cell transmission cycle following a current cell transmission cycle; and a cell transmission controller for
performing polling of the normal PHY layer devices,
designating a selected PHY layer device among the normal PHY layer devices which have returned the HIGH level of the cell transmission allowance signal to the polling and whereof corresponding FIFO memories are not empty,
controlling the transmission cell selector to select one of the FIFO memories corresponding to the selected PHY layer device as the next sender, and
designating the selected PHY layer device at an end of the current transmission cycle as a next receiver of the cell data to be transmitted through the data path interface at the next cell transmission cycle.

2. An ATM cell transmission system as recited in claim 1, wherein the data path interface and the normal PHY layer devices are designed according to a Utopia (Universal Test & Operations PHY interface for ATM) Level 2 specification.

3. An ATM cell transmission system as recited in claim 1, wherein each of the FIFO memories outputs an empty signal to the cell transmission controller, the empty signal being disabled when data of an ATM cell is prepared to be transmitted in said each of the FIFO memories.

4. An ATM cell transmission system having an ATM layer device, a data path interface and a plurality of normal PHY layer devices whereof each is connected to the ATM layer device by way of the data path interface and returns a HIGH level of a cell transmission allowance signal on condition said each can accept one more whole ATM cell when said each is polled by the ATM layer device through the data path interface; said ATM layer device comprising:

a cell buffer for storing ATM cells to be transmitted through the normal PHY layer devices;

FIFO memories each provided corresponding to each one of the normal PHY layer devices;

a transmission cell selector for selecting one of the FIFO memories as a next sender for transmitting cell data through the data path interface at a next cell transmission cycle following a current cell transmission cycle; and a cell transmission controller for
performing polling of the normal PHY layer devices,
designating a selected PHY layer device among the normal PHY layer devices which have returned the HIGH level of the cell transmission allowance signal to the polling and satisfy either of a first condition that at least one ATM cell to be forwarded thereto is stored in the cell buffer and a second condition that corresponding FIFO memories are not empty,
controlling the cell buffer to output an ATM cell to be transmitted through the selected PHY layer device into one of the FIFO memories corresponding to the selected PHY layer device on condition that the ATM cell is stored in the cell buffer,
controlling the transmission cell selector to select said one of the FIFO memories as the next sender, and
designating the selected PHY layer device at an end of the current transmission cycle as a next receiver of the cell data to be transmitted through the data path interface at the next cell transmission cycle.

5. An ATM cell transmission system as recited in claim 4, wherein the data path interface and the normal PHY layer devices are designed according to a Utopia Level 2 specification.

6. An ATM cell transmission system as recited in claim 4, wherein each of the FIFO memories outputs an empty signal to the cell transmission controller, the empty signal being disabled when data of an ATM cell is prepared to be transmitted in said each of the FIFO memories.

7. An ATM cell transmission system having an ATM layer device, a data path interface and a plurality of enhanced PHY layer devices whereof each is connected to the ATM layer device by way of the data path interface and returns a HIGH level of a cell transmission allowance signal on condition said each can accept K more whole ATM cells when said each is polled by the ATM layer device through the data path interface, K being an integer more than one; said ATM layer device comprising:

a cell buffer for storing ATM cells to be transmitted through the enhanced PHY layer devices;

a FIFO memory;

a cell transmission controller for
performing polling of the normal PHY layer devices,
designating a selected PHY layer device among the enhanced PHY layer devices which have returned the HIGH level of the cell transmission allowance signal to the polling and satisfy a condition that at least one ATM cell to be forwarded thereto is stored in the cell buffer,
controlling the cell buffer to output an ATM cell to be transmitted through the selected PHY layer device into the FIFO memory together with destination information of the ATM cell,
controlling the FIFO memory to transmit cell data of an ATM cell through the data path at a next cell transmission cycle when the FIFO memory is not empty, and designating an enhanced PHY layer device indicated by the destination information of the ATM cell at an end of the current transmission cycle as a next receiver of the cell data to be transmitted through the data path interface at the next cell transmission cycle.

8. An ATM cell transmission system as recited in claim 7, wherein the data path interface and the enhanced PHY layer devices are designed according to a Utopia Level 2 specification.

9. An ATM cell transmission system as recited in claim 7, wherein the integer K satisfies a condition $K \geq D+1$, D being a number of cell transmission cycles needed for outputting the ATM cell from the cell buffer to the FIFO memory after the polling is performed.

10. An ATM cell transmission system as recited in claim 7, wherein the FIFO memory outputs an empty signal and an output port number signal to the cell transmission controller, the empty signal being disabled and the output port number signal representing the destination information of an ATM cell when data of the ATM cell is prepared to be transmitted in the FIFO memory.

11. An ATM cell transmission system having an ATM layer device, a data path interface and a plurality of PHY layer devices whereof each is connected to the ATM layer device by way of the data path interface, and each is either one of a normal PHY layer device which returns a HIGH level of a cell transmission allowance signal on condition said each can accept one more whole ATM cell when said each is polled by the ATM layer device through the data path interface and an enhanced PHY layer device which returns the HIGH level of the cell transmission allowance signal on condition said each can accept K more whole ATM cells when said each is polled by the ATM layer device through the data path interface, K being an integer more than one; said ATM layer device comprising:

a cell buffer for storing ATM cells to be transmitted through the PHY layer devices;

a FIFO memory;

a cell transmission controller for
performing polling of the PHY layer devices,
designating a selected PHY layer device among the PHY layer devices which have returned the HIGH level of the cell transmission allowance signal to the polling and satisfy a first condition that at least one ATM cell to be forwarded thereto is stored in the cell buffer and a second condition that addresses thereof are not registered as one of D selected port numbers, D being a number of cell transmission cycles needed for outputting an ATM cell from the cell buffer to the FIFO memory according to the polling after the polling is performed, controlling the cell buffer to output an ATM cell to be transmitted through the selected PHY layer device into the FIFO memory together with destination information of the ATM cell, replacing one of the D selected port numbers which is registered earliest with an address of the selected PHY layer device when the selected PHY layer device is the normal PHY layer device and with an invalid address when the selected PHY layer device is the enhanced PHY layer device, controlling the FIFO memory to transmit cell data of an ATM cell through the data path at a next cell transmission cycle when the FIFO memory is not empty, and designating a PHY layer device indicated by the destination information of the ATM cell at an end of the current transmission cycle as a next receiver of the cell data to be transmitted through the data path interface at the next cell transmission cycle.

12. An ATM cell transmission system as recited in claim 11, wherein the data path interface and the PHY layer devices are designed according to a Utopia Level 2 specification.

13. An ATM cell transmission system as recited in claim 11, wherein the integer K satisfies a condition $K \geq D+1$.

14. An ATM cell transmission system as recited in claim 11, wherein the FIFO memory outputs an empty signal and an output port number signal to the cell transmission controller, the empty signal being disabled and the output port number signal representing the destination information of an ATM cell data when data of the ATM cell is prepared to be transmitted in the FIFO memory.

* * * * *